(12) United States Patent
Zhou et al.

(10) Patent No.: US 9,386,551 B2
(45) Date of Patent: Jul. 5, 2016

(54) SYSTEMS AND METHODS FOR SYNCHRONIZATION OF WIRELESS DEVICES IN AN AD-HOC NETWORK

(71) Applicant: Qualcomm Incorporated, San Diego, CA (US)

(72) Inventors: Yan Zhou, San Diego, CA (US); George Cherian, San Diego, CA (US); Santosh Paul Abraham, San Diego, CA (US)

( * ) Notice: Subject to any disclaimer, the term of this patent is extended or adjusted under 35 U.S.C. 154(b) by 141 days.

(21) Appl. No.: 13/835,788

(22) Filed: Mar. 15, 2013

(65) Prior Publication Data

US 2014/0153440 A1   Jun. 5, 2014

Related U.S. Application Data

(60) Provisional application No. 61/732,050, filed on Nov. 30, 2012, provisional application No. 61/732,043, filed on Nov. 30, 2012.

(51) Int. Cl.
*H04W 56/00* (2009.01)
*H04W 84/18* (2009.01)
*H04W 40/00* (2009.01)
(Continued)

(52) U.S. Cl.
CPC .......... *H04W 56/0015* (2013.01); *H04L 45/28* (2013.01); *H04W 40/005* (2013.01); *H04W 40/12* (2013.01); *H04W 40/20* (2013.01);
(Continued)

(58) Field of Classification Search
CPC ........................ H04W 28/021; H04W 84/18
See application file for complete search history.

(56) References Cited

U.S. PATENT DOCUMENTS 8,060,089 B1  11/2011  Bhan et al.
8,335,511 B2  12/2012  Singh et al.
(Continued)

FOREIGN PATENT DOCUMENTS

EP  1487155 A2  12/2004
EP  1548985 A1   6/2005
(Continued)

OTHER PUBLICATIONS

International Search Report and Written Opinion—PCT/US2013/070821—ISA/EPO—Feb. 19, 2014.

*Primary Examiner* — Edan Orgad
*Assistant Examiner* — Emmanuel Maglo

(57) ABSTRACT

Methods, devices, and computer program products for synchronization of wireless devices in an ad-hoc network are described herein. In one aspect, a method for synchronizing a wireless communication apparatus is provided. The method includes generating, at a wireless communication apparatus, one or more messages identifying a second device to generate prospective synchronization messages. In some aspects, the second device is a back-up root device. The method further includes transmitting a synchronization message. In one aspect, a root device for an ad-hoc network is responsible for generating synchronization messages for nodes of the ad-hoc network. The root device also generates and transmits a message which identifies a back-up root device. The back-up root device may assume responsibility for generating synchronization messages for the ad-hoc network in the event that the wireless communication apparatus no longer generates synchronization messages for the ad-hoc network. In an embodiment, the generated message identifying the back-up root device is included in a synchronization message.

54 Claims, 16 Drawing Sheets

(51) Int. Cl.

| | | |
|---|---|---|
| *H04W 40/20* | (2009.01) | |
| *H04W 40/22* | (2009.01) | |
| *H04W 40/24* | (2009.01) | |
| *H04W 84/20* | (2009.01) | |
| *H04W 40/12* | (2009.01) | |
| *H04L 12/703* | (2013.01) | |

(52) U.S. Cl.
CPC ............ *H04W40/22* (2013.01); *H04W 40/246* (2013.01); *H04W 84/18* (2013.01); *H04W 84/20* (2013.01)

(56) References Cited

U.S. PATENT DOCUMENTS

| | | | |
|---|---|---|---|
| 8,572,180 B2* | 10/2013 | Kern ................... H04L 63/0407 709/204 | |
| 2002/0013856 A1 | 1/2002 | Garcia-Luna-Aceves et al. | |
| 2004/0023651 A1 | 2/2004 | Gollnick et al. | |
| 2004/0233855 A1 | 11/2004 | Gutierrez et al. | |
| 2005/0086273 A1* | 4/2005 | Loebbert et al. .............. 707/204 |
| 2006/0052125 A1 | 3/2006 | Falck et al. | |
| 2006/0142034 A1 | 6/2006 | Wentink et al. | |
| 2006/0198346 A1 | 9/2006 | Liu et al. | |
| 2007/0008947 A1* | 1/2007 | Belcea ......................... 370/350 |
| 2007/0201382 A1* | 8/2007 | Ekl et al. ...................... 370/254 |
| 2007/0217406 A1 | 9/2007 | Riedel et al. | |
| 2008/0232344 A1 | 9/2008 | Basu et al. | |
| 2009/0313310 A1* | 12/2009 | Thome et al. ................. 707/203 |
| 2009/0323644 A1 | 12/2009 | Yokota | |
| 2010/0254309 A1 | 10/2010 | Mankins et al. | |
| 2011/0128905 A1* | 6/2011 | Kawauchi et al. ............... 370/315 |
| 2013/0132502 A1* | 5/2013 | Stacey et al. ................. 709/208 |
| 2013/0185373 A1* | 7/2013 | Vandwalle et al. ........... 709/208 |
| 2014/0153444 A1 | 6/2014 | Zhou et al. | |

FOREIGN PATENT DOCUMENTS

| | | |
|---|---|---|
| WO | 0074402 A1 | 12/2000 |
| WO | 02060134 | 8/2002 |
| WO | 2008027294 A2 | 3/2008 |
| WO | WO 2008027294 A2 * | 3/2008 |
| WO | 2008085660 A1 | 7/2008 |
| WO | 2009135061 A1 | 11/2009 |

\* cited by examiner

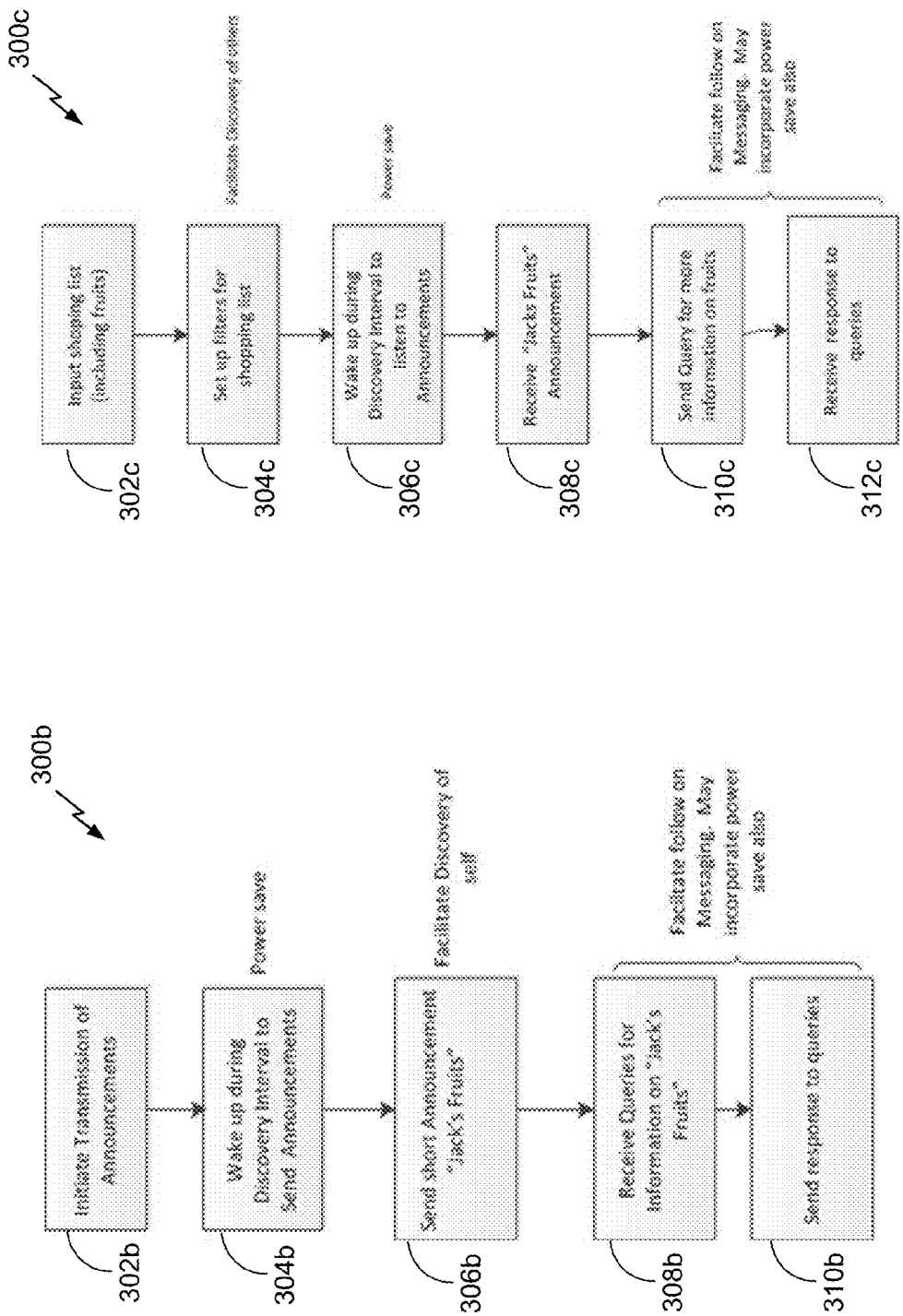

SYSTEMS AND METHODS FOR SYNCHRONIZATION OF WIRELESS DEVICES IN AN AD-HOC NETWORK

CROSS REFERENCE TO RELATED APPLICATIONS

This application claims the benefit of U.S. Provisional Application 61/732,050, filed Nov. 30, 2012, and entitled "SYSTEMS AND METHODS FOR SYNCRHONIZATION OF WIRELESS DEVICES IN AN AD-HOC NETWORK," and U.S. Provisional Application 61/732,043, filed Nov. 30, 2012, and entitled "SYSTEMS AND METHODS OF SELECTIVE SCANNING FOR AD-HOC NETWORKS," both of which are assigned to the assignee of the present application. The disclosures of these two applications are hereby incorporated by reference in their entirety. This application is related to U.S. application Ser. No. 13/836,178, entitled "SYSTEMS AND METHODS OF SELECTIVE SCANNING FOR AD-HOC NETWORKS," filed on even date herewith, and is incorporated herein by reference, in its entirety.

BACKGROUND

1. Field

The present application relates generally to wireless communications, and more specifically to systems, methods, and devices for synchronization of wireless devices in an ad-hoc wireless network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities. Improved systems, methods, and devices for coordinating transmitting and sending communications within a wireless network are desired.

FIG. 1a illustrates an example of a prior art wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs. Some possible communication links between STAs are illustrated in FIG. 1a. As an example, a communication link 112 may facilitate transmission from the first STA 106a to the second STA 106b. Another communication link 114 may facilitate transmission from the second STA 106b to the first STA 106a.

The AP 104 may function as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer or ad-hoc network between the STAs. Accordingly, the functions of the AP 104 described herein may alternatively be performed by one or more of the STAs.

FIG. 1b illustrates an example of a prior art wireless communication system 160 that may function as a peer-to-peer or ad-hoc network. For example, the wireless communication system 160 shown in FIG. 1b shows STAs 106a-i that may communicate with each other without the presence of an AP. As such, the STAs, 106a-i may be configured to communicate in different ways to coordinate transmission and reception of messages to prevent interference and accomplish various tasks. In one aspect, the networks shown in FIG. 1b may configured as a "near-me are network" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the ad-hoc communications network 160 may schedule periods of time during which communication between network nodes may occur. These periods of time when communication occurs between STAs a-i may be known as availability windows. An availability window may include a discovery interval or paging interval as discussed further below.

The protocol may also define other periods of time when no communication between nodes of the network is to occur. In some embodiments, nodes may enter one or more sleep states when the ad-hoc network 160 is not in an availability window. Alternatively, in some embodiments, portions of the stations 106a-i may enter a sleep state when the ad-hoc network is not in an availability window. For example, some stations may include networking hardware that enters a sleep state when the ad-hoc network is not in an availability window, while other hardware included in the STA, for example, a processor, an electronic display, or the like do not enter a sleep state when the ad-hoc network is not in an availability window.

The ad-hoc communication network 160 may assign one node to be a root node. In FIG. 1b, the assigned root node is shown as STA 106e. In ad-hoc network 160, the root node is responsible for periodically transmitting synchronization signals to other nodes in the ad-hoc network. The synchronization signals transmitted by root node 160e may provide a timing reference for other nodes 106a-d and 106f-i to coordinate an availability window during which communication occurs between the nodes. For example, a synchronization message 172a-d may be transmitted by root node 106e and received by nodes 106b-c and 106f-g. The synchronization message 172 may provide a timing source for the STAs 106b-c and 106f-g. The synchronization message 172 may also provide updates to a schedule for future availability windows. The synchronization messages 172 may also function to notify STAs 106b-c and 106f-g that they are still present in the ad-hoc network 160.

One or more of the nodes in the ad-hoc communication network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b-c and 106f-g are shown functioning as branch-synchronization nodes in the ad-hoc communication network 160. STAs 106b-c and 106f-g receive the synchronization message 172a-d from root node 106e and retransmit the synchronization message as retransmitted synchronization messages 174a-d. By retransmitting the synchronization message 172 from root node 106e, the branch synchronization nodes 106b-c and 106f-g may extend the range and improve the robustness of the ad-hoc network 160.

The retransmitted synchronization messages 174a-d are received by nodes 106a, 106d, 106h, and 106i. These nodes may be characterized as "leaf" nodes, in that they do not retransmit the synchronization message they receive from either the root node 106e or the branch synchronization nodes 106b-c or 106f-g.

FIG. 1c illustrates an example of a prior art wireless communication system implementing an ad-hoc network 160. In FIG. 1c, the ad-hoc network 160 is shown after the root node 106e of FIG. 1c has left the ad-hoc network 160. Root node 106e may leave the network 160 for one of several reasons. For example, a hardware failure on root node 106e may prevent it from continuing to transmit synchronization messages 172 as shown in FIG. 1c. Alternatively, root node 106e may be a mobile device, and as such the root node 106e may move out of range of the ad-hoc network 160. As a result of the root node 106e being out of range, any synchronization messages transmitted by root node 106e will not be received by other nodes of the ad-hoc network 160.

In response to root node 106e leaving the ad-hoc network 160, at least some of the devices included in the ad-hoc network 160 may lose synchronization with other nodes of the ad-hoc network. For example, because the root node 106e may no longer be transmitting synchronization messages, an availability window between the remaining nodes of the ad-hoc network may not be maintained. In response, the remaining nodes of the network may renegotiate to determine a new root. For example, as shown in FIG. 1c, the renegotiation process may include, as an initial step, each node of the ad-hoc network 160 designating itself as a new root node. As such, each node may begin transmitting synchronization messages, as shown by synchronization messages 180a-h. Since the ad-hoc network 160 may not support multiple root nodes, additional negotiation may be performed between the remaining nodes to determine which of the remaining nodes is a new root node. For example, in some implementations, the signal strength of the synchronization messages 180a-h as received by each of the remaining nodes may be used to determinate the new root.

This resynchronization process may consume processing resources of each of the devices in the ad-hoc network 160. Additionally, a minimum amount of elapsed time may be necessary for the devices of the ad-hoc network 160 to resynchronize. During this resynchronization time period, communication between nodes of the ad-hoc network 160 may be disrupted.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method for wireless communication performed by a root device within an ad-hoc network. The method includes generating a message, the message identifying a second device to generate prospective synchronization messages, and transmitting a synchronization message.

Another aspect disclosed is a root device for wireless communication within an ad-hoc network. The root device includes a processor configured to generate a message, the message identifying a second device to generate prospective synchronization messages, and a transmitter configured to transmit a synchronization message.

Another aspect disclosed is a non-root device for communicating over an ad-hoc wireless network. The device includes means for receiving a message from a root device, the message indicating the non-root device will generate prospective synchronization messages, means for determining whether the root device is available, and means for transmitting a synchronization message based on the determining.

Another aspect disclosed is a non-transitory, computer readable medium including instructions that when executed cause a processor in a root device to perform a method for wireless communication within an ad-hoc network. The method includes generating a message, the message identifying a second device to generate prospective synchronization messages, and transmitting a synchronization message.

Another aspect disclosed is a method of communicating over an ad-hoc wireless network with a device. The method includes receiving a message from a root device, the message indicating a receiving device will generate prospective synchronization messages, determining whether the root device is available, and transmitting a synchronization message based on the determining. In some aspects the received message is a synchronization message. In some aspects, determining whether the root node is available includes determining whether a synchronization message has been received within a predetermined time period. In some aspects, determining whether the root node is available comprises determining that the root node will not be available soon based on receiving the message.

Another aspect disclosed is a non-root device for communicating over an ad-hoc wireless network. The device includes a receiver configured to receive a message from a root device, the message indicating the non-root device will generate prospective synchronization messages, a processor configured to determine whether the root device is available, and a transmitter configured to transmit a synchronization message based on the determining. In some aspects, the received message is a synchronization message. In some aspects, the processor is further configured to determine whether the root node is available by at least in part determining whether a synchronization message has been received within a predetermined time period. In some aspects, the processor is further configured to determine whether the root node is available at least in part by determining that the root node will not be available soon based on receiving the message.

Another aspect disclosed is a non-root device for communicating over an ad-hoc wireless network. The device includes means for receiving a message from a root device, the message indicating the non-root device will generate prospective synchronization messages, means for determining whether the root device is available, and means for transmitting a synchronization message based on the determining. In some aspects, the received message is a synchronization message. In some aspects, the means for determining is configured to determine whether a synchronization message has been received within a predetermined time period. In some aspects, the means for determining is configured to determine whether the root node is available at least in part by determining that the root node will not be available soon based on receiving the message.

Another aspect disclosed is a non-transitory, computer readable medium comprising instructions that when executed cause a processor to perform a method of communicating over an ad-hoc wireless network with a device. The method includes receiving a message from a root device, the message indicating a receiving device will generate prospective synchronization messages, determining whether the root device is available, and transmitting a synchronization message based on the determining. In some aspects, the received message is a synchronization message. In some aspects, determining whether the root node is available includes determining whether a synchronization message has been received within a predetermined time period. In some aspects, determining whether the root node is available comprises determining that the root node will not be available soon based on receiving the message.

BRIEF DESCRIPTION OF THE DRAWINGS

FIG. 3b is a flowchart of an exemplary process of discovering devices in a wireless communication system in accordance with aspects of the present disclosure.

FIG. 3c is a flowchart of an exemplary process of querying devices in a wireless communication system in accordance with aspects of the present disclosure.

DETAILED DESCRIPTION

Figure 1A:
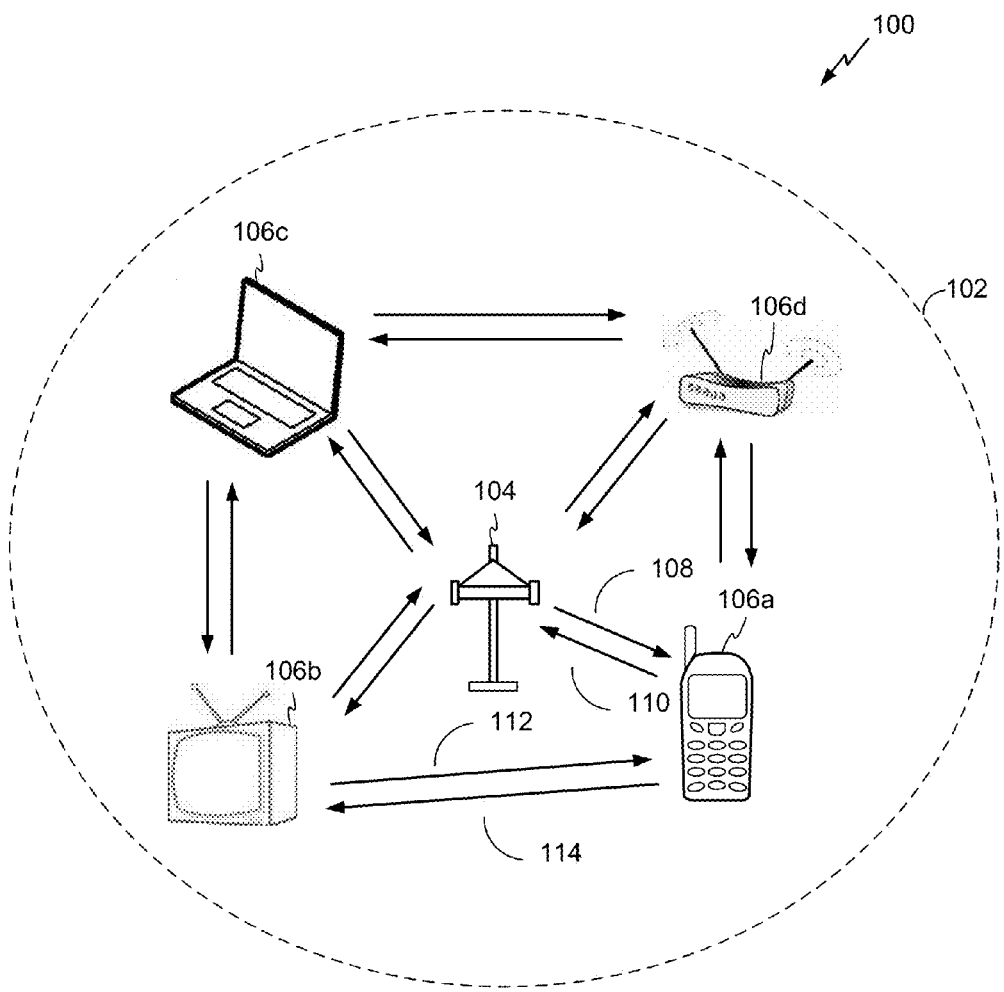
FIG. 1a illustrates an example of a prior art wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, a root node of an ad-hoc network may transmit synchronization messages to coordinate one or more availability windows for communication between nodes of the ad-hoc network. If the root node leaves the network, a resynchronization process may be necessary between remaining nodes to determine a new root node. This resynchronization process may consume processing resources of the nodes of the ad-hoc network, and disrupt communications over the network until a new root is identified. Some aspects disclosed provide for the transmission of a message identifying a device to generate prospective synchronization messages. For example, the identified device in the message may be a back-up root node. The back-up root node may assume responsibility for transmission of synchronization messages in the event that a primary root node leaves the ad-hoc network. Identification of a back-up root node before a root node leaves an ad-hoc network may reduce the need for a distributed resynchronization process as described above. This may reduce overhead processing on each device of the network associated with a distributed determination of a new root node. This may also reduce or eliminate disruption of communication over the ad-hoc network when a primary root node leaves the ad-hoc network.

Figure 2:
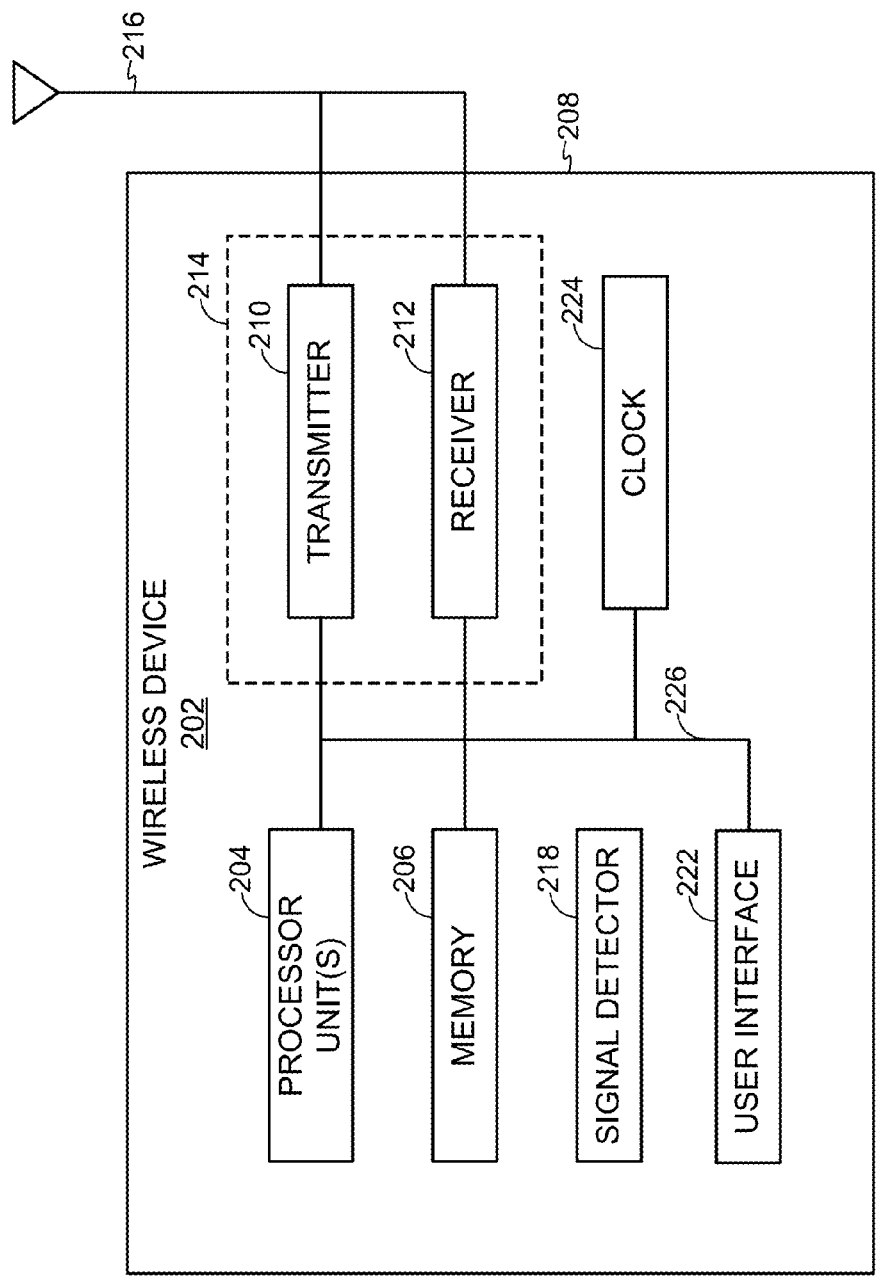
FIG. 2 illustrates a functional block diagram of a wireless device that may be employed within the wireless communication system of FIGS. 1a-c.

FIG. 2 illustrates various components that may be utilized in a wireless device 202 that may be employed within the wireless communication system 100 or 160. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. In addition, the wireless device 202 may include a clock 224 configured to generate a clock signal that is used to coordinate and synchronize activities of the wireless device 202. In some configurations, the processor 204 may include the clock 224. The processor 204 may be configured to update the clock with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 1B:
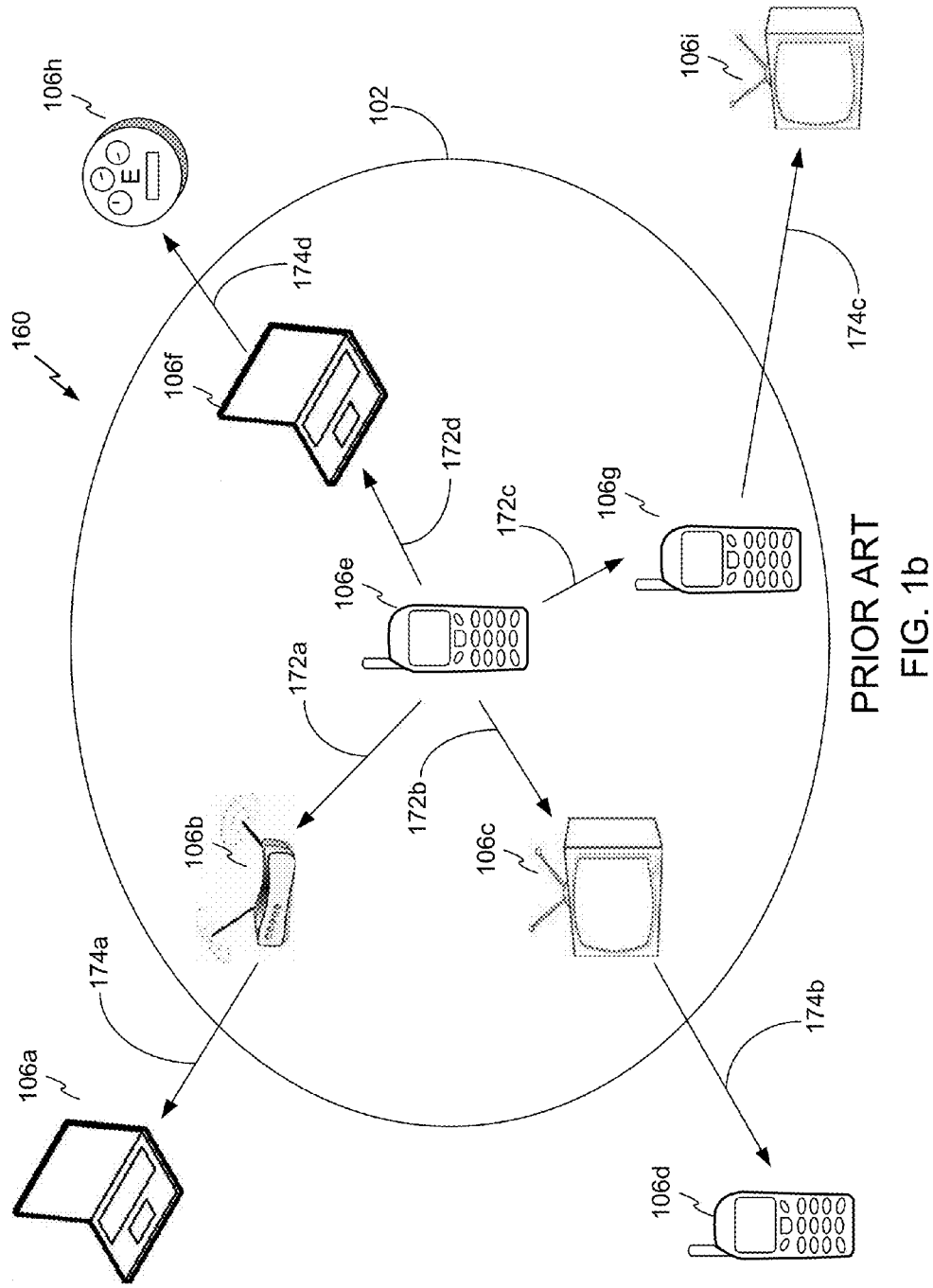
FIG. 1b illustrates another example of a prior art wireless communication system.

Devices, such as STAs, 106a-i shown in FIG. 1b, for example, may be used for neighborhood aware networking, or social-WiFi networking. For example, various stations within the network may communicate on a device to device (e.g., peer-to-peer communications) basis with one another regarding applications that each of the stations supports. A discovery protocol may be used in a social-WiFi network to enable STAs to advertise themselves (e.g., by sending discovery packets) as well as discover services provided by other STAs (e.g., by sending paging or query packets), while ensuring secure communication and low power consumption. Furthermore, at least a portion of the discovery protocol may be related to coordinating and/or synchronizing activities of the STAs. It should be noted that a discovery packet may also be referred to as a discovery message or a discovery frame. It should also be noted that a paging or query packet may also be referred to as a paging or query message or a paging or query frame.

Furthermore, to ensure proper communication between multiple STAs, STAs may require information regarding characteristics of other STAs. For example, the STA 106 may require timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may always be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 1C:
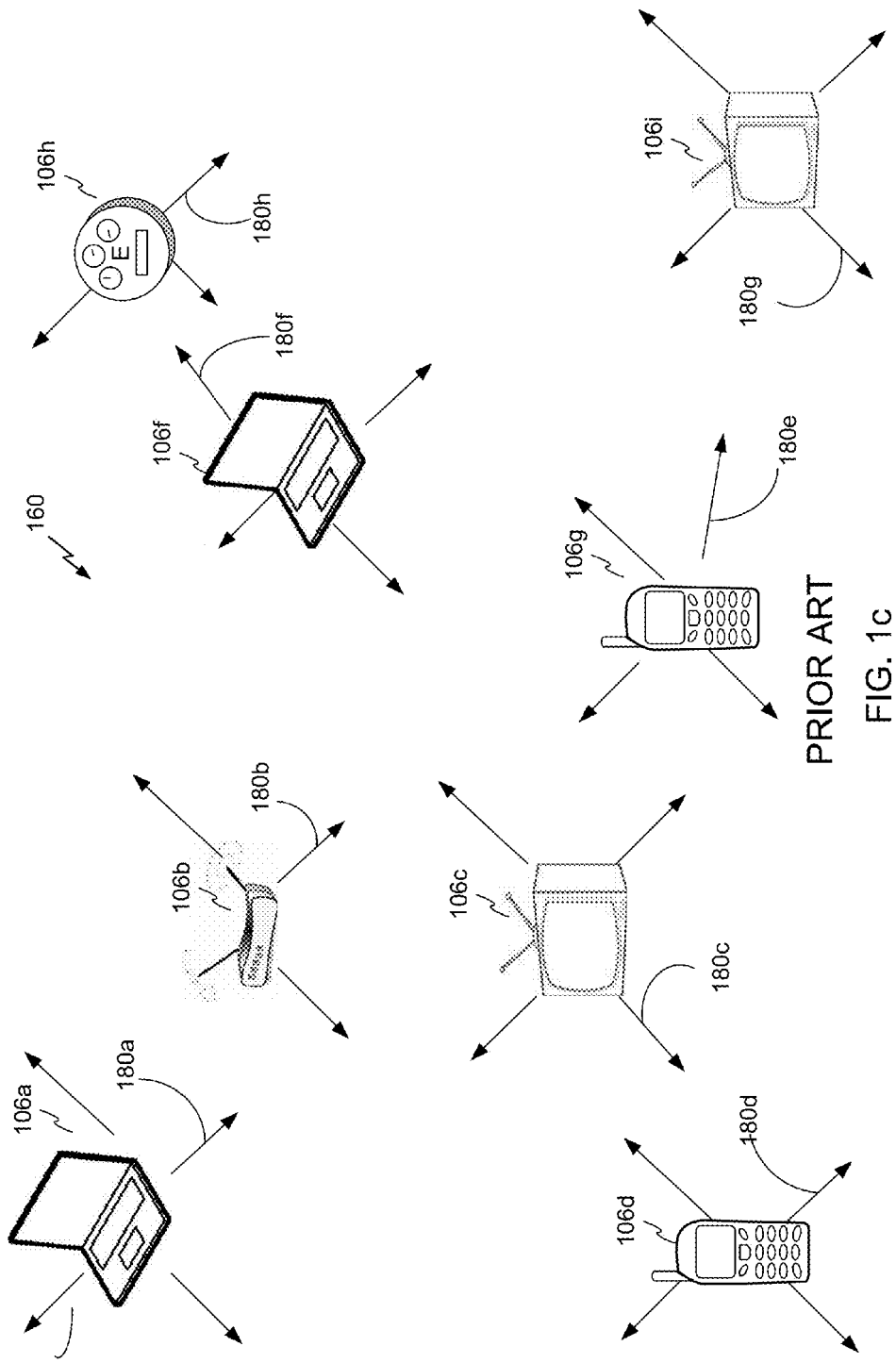
FIG. 1c illustrates an example of a prior art wireless communication system implementing an ad-hoc network.
Figure 3A:
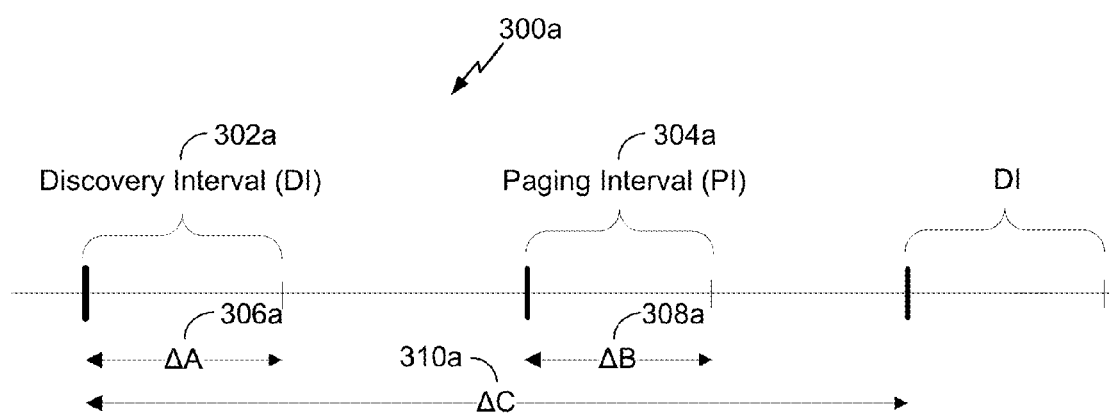
FIG. 3a illustrates an exemplary communication timeline in a wireless communication system in accordance with aspects of the present disclosure.

FIG. 3a illustrates an exemplary communication timeline 300a in a wireless communication system where STAs may communicate via one channel. In one aspect, the communication according to the timeline shown in FIG. 3a may be used in a peer-to-peer wireless network, such as the network shown in FIG. 1b or FIG. 1c. The exemplary communication timeline 300a may include a discovery interval (DI) 302a of a time duration $\Delta A$ 306a, a paging interval (PI) 304a of a time duration $\Delta B$ 308a, and an overall interval of a time duration $\Delta C$ 310a. In some aspects, communications may occur via other channels as well. Time increases horizontally across the page over the time axis.

During the DI 302a, APs or STAs may advertise services through broadcast messages such as discovery packets. APs or STAs may listen to broadcast messages transmitted by other APs or STAs. In some aspects, the duration of DIs may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3a. However, different combinations of remainder time periods are contemplated. The discovery interval may be equivalent to the availability window discussed earlier with respect to FIGS. 1a and 1b.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration $\Delta C$ 310a may measure the period of time from the beginning of one DI to the beginning of a subsequent DI as illustrated in FIG. 3a. In some aspects, the duration of the overall interval may vary over time. In other aspects, the duration of the overall interval may remain constant over a period of time. At the conclusion of the overall interval of duration $\Delta C$ 310a, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration $\Delta C$ of the overall interval may equal approximately one to five seconds in some aspects. In other aspects, the overall interval may be less than one second or more than five seconds. The duration $\Delta A$ of the DI may equal approximately 16 milliseconds in some aspects while more or less than 16 milliseconds in other aspects. The duration $\Delta B$ of the PI may equal approximately the duration $\Delta A$ in some aspects. In other aspects, the duration $\Delta B$ may be more or less than the duration $\Delta A$.

FIG. 3b is a flowchart of an exemplary process 300b of discovering devices in a wireless communication system. The process 300b may be used to introduce two devices, such as two STAs and 106b. For example, a STA may advertise information about one or more of a plurality of services that may be of interest to various other STAs to which the information is directed. In some embodiments, a service offered by a STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits," in order to facilitate discovery of the STA. The short announcements may include a discovery packet or message. The receiving STAs that are interested in the one or more services advertised by the STA may respond with a paging request (or query request) packet or message that indicates interest in the service provided by the STA. At block 308b, the STA may receive queries (e.g., a paging or query request) for information on the particular service, such as "Jack's Fruits." In response, at block 310b, the STA may send a response to the queries. Follow on messaging between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3c is a flowchart of an exemplary process 300c of querying devices in a wireless communication system in accordance with aspects of the present disclosure. At block 302c, a STA may input a shopping list, which may include various vendors that a user of the STA may have an interest. For example, a user may download a shopping list from the Internet. Although the process 300c is described with respect to a shopping application, those having ordinary skill in the art will appreciate that the process 300c applies to other applications, such as gaming applications, social networking applications, etc. At block 304c, the STA may set up filters for the shopping list. For example, a filter may be set up to allow the STA to wake up from a power-save mode or sleep mode only when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310c, the STA sends a query for more information relating to the announcement, such as more information on Jack's Fruits. At block 312c, the STA may receive a response to one or more queries that the STA sent to other STAs regarding services offered by the other STAs.

It is desirable for the STAs described above (e.g., using a discovery protocol used in a social-WiFi network) to be able to advertise themselves, as well as discover services provided by other STAs, using a secure communication protocol and while keeping power consumption low. For example, it is desirable for a STA to advertise its offered services by securely sending discovery packets or messages and for the STA to discover services offered by other STAs by securely sending paging or query packets or messages while avoiding excess power consumption. For example in accordance with certain embodiments, STAs may "sleep" a majority of a time period and wake up for short discovery intervals as described to decrease power consumption. There may be certain conditions that allow the STAs to make use of short time intervals to decrease power consumption while still effectively allowing discovery and advertisement of services within the network. For example, it is desirable that STAs that transmit during the short time intervals "know" that intended receivers are active to receive the transmitting messages. In addition, it is further desirable that STAs that are searching for different services advertised by another STA 106 activate their receivers at the appropriate time to receive messages advertising services from other STAs. As such, certain embodiments described herein are directed to synchronization between different STAs to allow for performing device discovery as described above and for synchronization of other communications while allowing for reduced power consumption. For example certain embodiments are directed to synchronization so that STAs are activated for transmitting and receiving at the same time.

Furthermore, when STAs communicate without a central coordinator, such as an AP 104, synchronization of communications between the STAs may be desirable. As just described, if the STAs are not synchronized, the STAs may not receive discovery messages within the discovery interval, or be able to transmit paging requests within the correct paging interval to be received by other STAs. Synchronization therefore may provide a common reference time that may be used to determine timing of communication intervals such as the discovery interval 302a and the paging interval 304a. As each STA 106 operates independently of the other STAs, each generating an individual clock signal, the clock signal may become out of sync. For example, if a STA 106 is in a "doze" state, the clock signal may drift and define a reference time value that is faster or slower as compared to other clocks signals of other STAs.

Certain aspects described herein are directed to devices and methods for synchronization of clock signals of STAs operating in a peer-to-peer fashion. In aspect, at least some of the STAs may transmit the current time value of their clock signals to the other STAs. For example, in accordance with certain embodiments, STAs may periodically transmit a 'sync' frame that carries a time stamp. The current time value may correspond to a time-stamp value. For example, in one embodiment, a discovery message as described above may serve as the 'sync' frame and carry a current time value of a STA 106. In addition to the time stamp, the sync frame may also include information regarding the discovery interval and discovery period. For example, the sync frame may include the schedule of the discovery interval and discovery period. In some embodiments, the sync frame may also include information identifying a device to generate prospective synchronization messages. For example, an indication of a back-up root node may be included in the sync frame.

Upon receipt of a sync frame, a STA 106 that may be new to the network may determine the time and the discovery interval/discovery period schedule in the network. STAs already communicating within the network may maintain synchronization while overcoming clock drift as described below. Based on the sync message, STAs may enter and exit a network (e.g., a NAN) without losing synchronization. Furthermore, the synchronization messages described herein may allow for avoiding excessive power drain and the STAs in the network may share the burden of messaging for synchronization. Furthermore, certain embodiments allow for a low messaging overhead (e.g., as only a few devices may send sync frames in every discovery period as will be described below). As described above with reference to FIG. 3A, discovery packets within a NAN are transmitted during a discovery interval 302a that occurs every discovery period. As such, sync messages may be sent during a discovery interval 302a for certain discovery periods.

It should be appreciated that a STA 106 may not transmit a sync frame every discovery interval. Rather, a probability value (P_sync), as is further described below, may be used to determine whether the STA 106 transmits and/or prepares a sync frame. As such, while at least some sync frames are sent for every discovery interval, not all the STAs participating in the NAN transmit a sync frame for every discovery interval. This may allow for reduced power consumption in transmitting sync frames while still enabling synchronization.

Figure 4A:
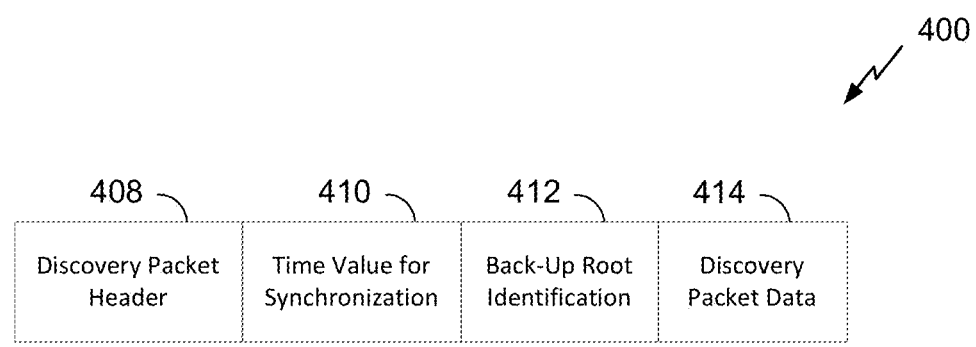
FIG. 4A illustrates a message that may include a time value for synchronization.

FIG. 4A illustrates a message 400 that may include a time value for synchronization. As described above, in some embodiments, the message 400 may correspond to a discovery message as described above. The message 400 may include a discovery packet header 408. The message may further include 410 a time value for synchronization 410. In some embodiments, the discovery packet header 408 may include the time value 410. The time value may correspond to a current time value of a clock signal of a STA 106 transmitting the message 400. The message 400 may further include back-up root identification 412. Back-up root identification may identify a device to generate prospective synchronization messages. The message 400 may further include discovery packet data 414. While FIG. 4A shows discovery message serving as the sync message, it should be appreciated that according to other embodiments, the sync message may be sent apart from the discovery message.

Figure 4B:
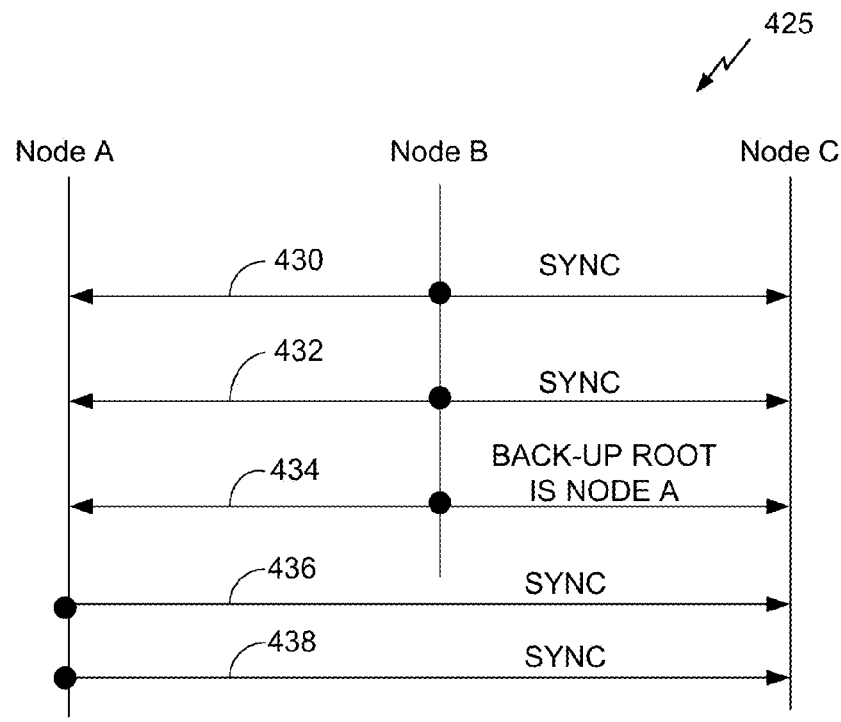
FIG. 4B is a sequence diagram illustrating a series of messages transmitted on an ad-hoc wireless network.

FIG. 4B is a sequence diagram 425 illustrating a series of messages transmitted on an ad-hoc wireless network. Sequence diagram 425 shows three nodes, Node A, Node B, and Node C, operating within an ad-hoc network. Node B is shown operating as a primary root. As such, Node B transmits synchronization messages 430 and 432. These synchronization messages are received by Node A and Node C. Node A and Node C may utilize the synchronization messages 430 and 432 to update their timing references used to communicate on the ad-hoc network. Node B also sends a message 434 which identifies Node A as the back-up root. In an embodiment, Node B may send message 434 in response to determining that it is about to leave the ad-hoc network. In the illustrated embodiment, Node A then sends synchronization messages 436 and 438 in response to receiving the message 434. Node C is shown receiving synchronization messages 436 and 438, which Node C may use to update its timing references used to communicate on the ad-hoc network.

Figure 4C:
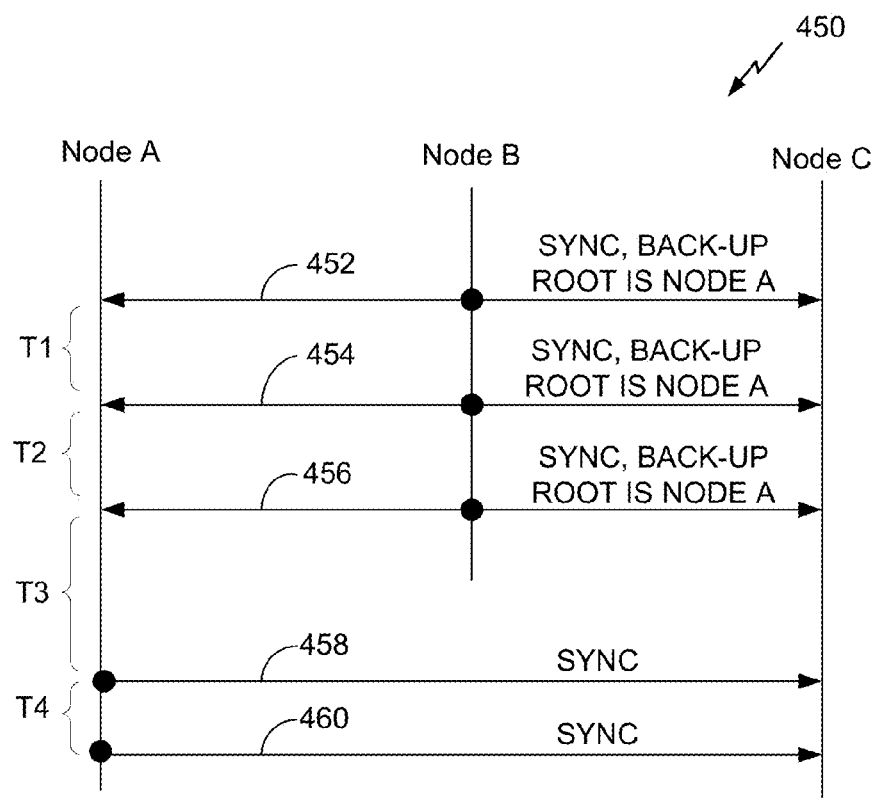
FIG. 4C is a sequence diagram illustrating a series of messages transmitted on an ad-hoc wireless network.

FIG. 4C is a sequence diagram 450 illustrating a series of messages transmitted on an ad-hoc wireless network. Similar to FIG. 4B, sequence diagram 450 also shows three nodes, Node A, Node B, and Node C, operating within an ad-hoc network. Node B is again shown operating as a primary root. As such, Node B transmits synchronization messages 452, 454, and 456. These messages are transmitted at an interval shown as T1 and T2. In the embodiment shown in FIG. 4C, the synchronization messages also identify a back-up root device, in this case, Node A. Messages 452, 454, and 456 are received by Node A and Node C. When Node A receives messages 452 and 454, it may determine that the messages identify it as a back-up root device. Unlike the embodiment of FIG. 4B, Node A does not immediately begin transmitting synchronization messages upon receiving either of messages 452 or 454. Instead, in the illustrated embodiment, upon being identified as the back-up root, Node A may monitor the synchronization messages received from Node B. Node A may begin transmitting synchronization messages itself if no synchronization messages are received from Node A within a predetermined time period. For example, time intervals T1 and T2 may be less than the predetermined time period. Interval T3 may be longer than the predetermined time period. In an embodiment, one or more synchronization messages transmitted by Node A, such as messages 458 and/or 460 may also identify a new back-up root device.

Figure 5:
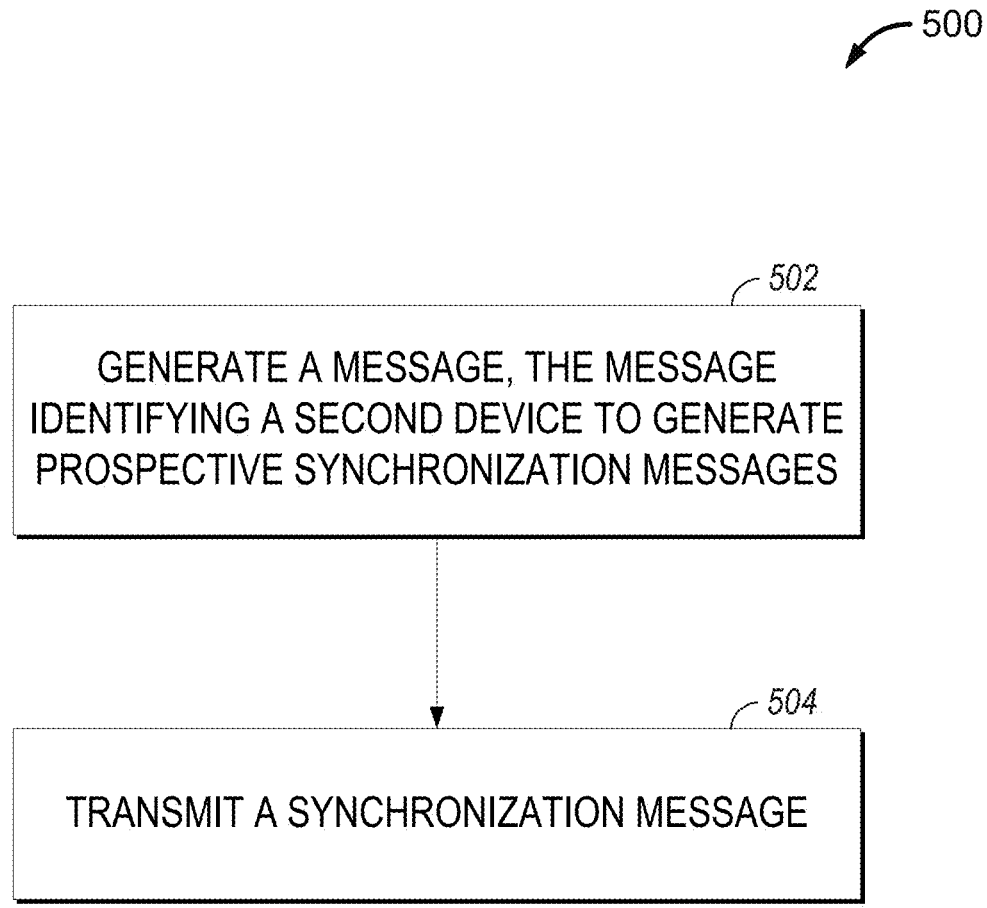
FIG. 5 is a flowchart of a method of synchronizing a wireless communications apparatus, in accordance with an embodiment.

FIG. 5 is a flowchart of a method 500 of wireless communication. In an embodiment, process 500 is performed by a root device in an ad-hoc network. In another embodiment, process 500 is performed by a back-up root device in an ad-hoc network. Although the method 500 is described below with respect to the elements of the wireless device 202, those having ordinary skill in the art will appreciate that other components may be used to implement one or more of the blocks described herein.

At block 502, a message is generated. The message identifies a second device to generate prospective synchronization messages. In an embodiment, a device identifier included in the message identifies the second device. In an embodiment, the message also includes timing information. In some implementations, the timing information is based on a hardware or device clock. In some implementations the message may include timing information to synchronize an availability window or discovery interval (DI) between nodes in an ad-hoc network, as discussed above with respect to FIG. 1b. Therefore, in some implementations, the message is a synchronization message. In block 504, a synchronization message is transmitted.

In an embodiment, the generated message may be transmitted. In some embodiments, the generated message is transmitted in response to a root node determining that it will be leaving an ad-hoc network. For example, a root device may transmit the generated message before leaving the network. In these embodiments, the device identified in the transmitted message may begin transmitting synchronization messages in response to receiving the message generated in block 502. In these embodiments, the message generated in block 502 identifies a second device that will generate immediately subsequent synchronization messages.

In another embodiment, the generated message may be transmitted periodically. In an embodiment, by periodically identifying another device to generate prospective synchronization messages, other nodes of an ad-hoc network can identify a back-up root device even if a root node leaves the ad-hoc network unexpectedly. For example, a hardware failure on a root node may prevent a root node from performing any specific processing before it leaves an ad-hoc network. Therefore, in some environments, a message identifying another device to generate prospective synchronization messages may be transmitted by the root node to other nodes in an ad-hoc network well before potential failures occur. In some embodiments, such a message may be transmitted periodically. This may result in a more efficient transition from a primary root node to the back-up root node.

In these embodiments, each node receiving the generated message may determine if the second device identified in the message is the receiving node. If the receiving node is identified, the receiving node may record an indication that it is a back-up root for the ad-hoc network.

In some embodiments, nodes may rely on an event other than reception of the generated message to determine that a new root should begin transmitting synchronization messages. For example, in an embodiment, the generated message may be transmitted by a primary root of an ad-hoc network. The generated message may identify a back-up root. In an embodiment, the back-up root may wait for synchronization messages to be received from the primary root. If no synchronization message is received from the primary root within a first predetermined time duration, the back-up root may begin transmitting synchronization messages for the ad-hoc network.

In these embodiments, if nodes on an ad-hoc network do not receive any synchronization messages within a second predetermined time duration, the devices may begin a resynchronization process to determine a new root. For example, in an embodiment, the nodes of the ad-hoc network may utilize a resynchronization process as described above with respect to FIG. 1c. In an embodiment, the second predetermined time duration is longer than the first predetermined time duration.

In an embodiment, process 500 includes receiving a message identifying a device performing process 500. In an embodiment, the message is received from a root node in the ad-hoc network. In an embodiment, reception of the message may indicate the receiving device performing process 500 is a back-up root for the ad-hoc network. In an embodiment, a back-up root may become a primary root when it transmits a synchronization message. In response to becoming a new primary root, the new primary root may begin determination of a second back-up root.

In an embodiment, a back-up root may be determined based on a received signal strength indication (RSSI) or based on recent network activity. In an embodiment, a node with the highest RSSI may be selected as a back-up root. In an embodiment, a node with the smallest path loss to the root may be selected as a back-up root. In an embodiment, selection of the back-up root may be based on whether a node has been active within a predetermined time period. For example, in an embodiment, only nodes active within a past predetermined number of seconds may be selected as a back-up root, where the predetermined number may be any value depending on the implementation. In some embodiments, if a back-up root is not active within a predetermined time period, a root node may determine a new back-up root. In some embodiments, determination of a back-up root occurs periodically. In these embodiments, process 500 may also be performed by a primary root periodically.

Figure 6:
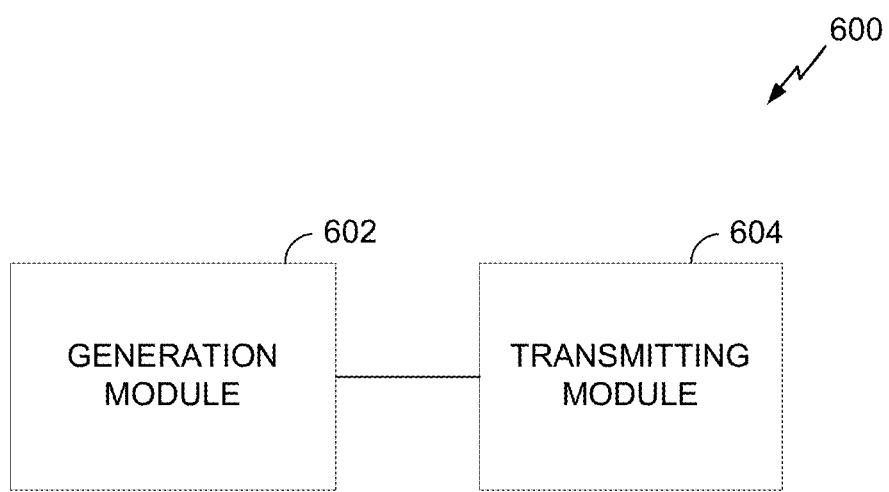
FIG. 6 is a functional block diagram of an exemplary wireless communication apparatus that may be employed with the wireless communication system of FIG. 1a, or FIG. 1b.

FIG. 6 is a functional block diagram of an exemplary wireless communication device 600 that may be employed with the wireless communication system of FIG. 1*a*, or FIG. 1*b*. The wireless device 600 may include a generation module 602. In an embodiment, the generation module 602 may the processor unit(s) 204. In one aspect, means for generating may include the generating module 602. The generating module 602 may be configured to perform one or more of the functions described above with respect to block 502 of FIG. 5. In one aspect, the generating module 602 may also include one or more of a processor, signal generator, transceiver, decoder, or a combination of hardware and/or software component(s), circuits, and/or module(s). The wireless device 600 may further include a transmitting module 604. In one aspect, the transmitting module 604 may include the transmitter 210 of FIG. 2. In one aspect, the transmitting module 604 may also include one or more of a processor, signal generator, transceiver, decoder, or a combination of hardware and/or software component(s), circuits, and/or module(s). In one aspect, means for transmitting may include the transmitting module 604. In one aspect, the transmitting module 604 may be configured to perform one or more of the functions described above with respect to block 504 of FIG. 5.

Figure 7:
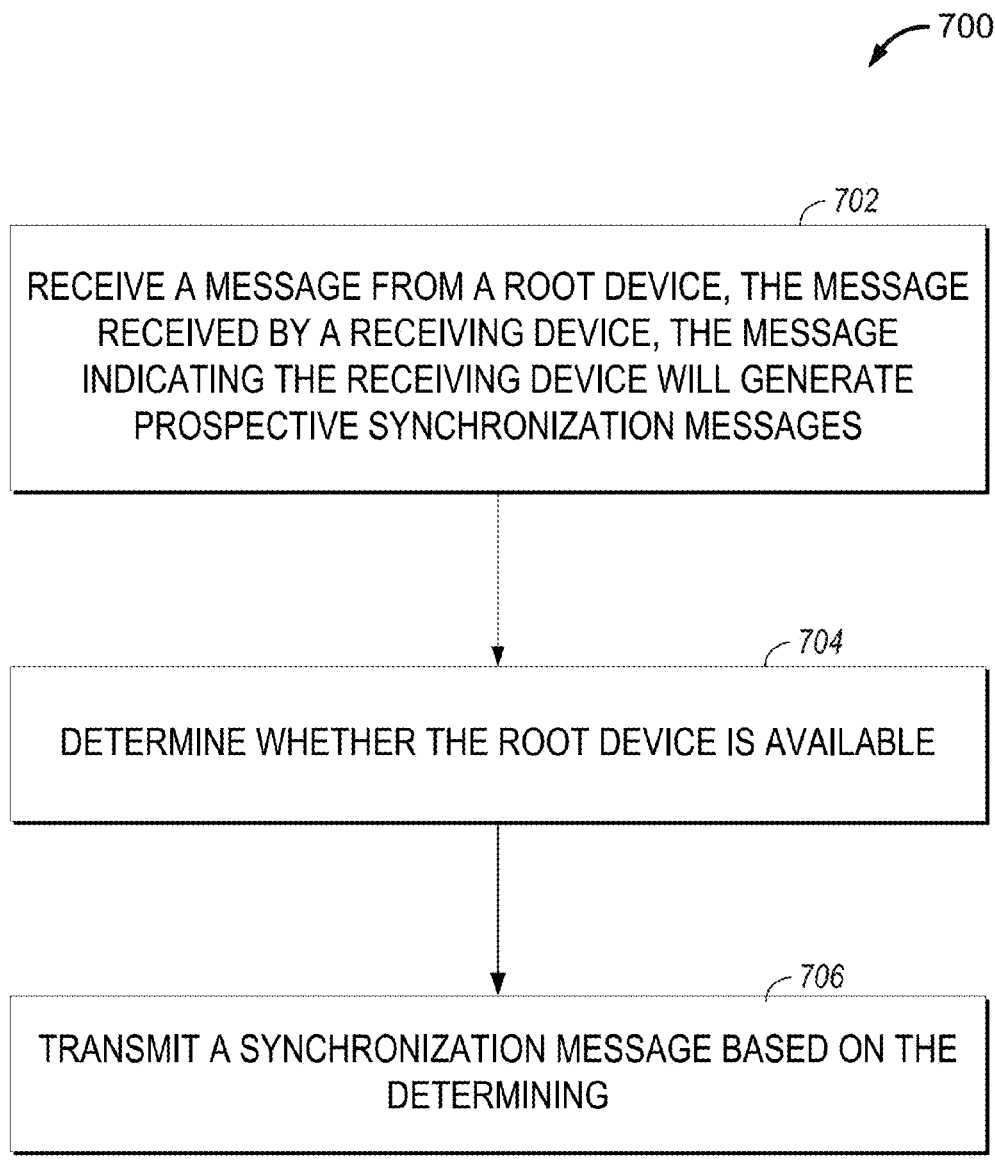
FIG. 7 is a flowchart of a method of synchronizing a wireless communications apparatus, in accordance with an embodiment.

FIG. 7 is a flowchart of a method 700 of wireless communication. In an embodiment, process 700 is performed by a non-root or back-up root device in an ad-hoc network. Although the method 700 is described below with respect to the elements of the wireless device 202, those having ordinary skill in the art will appreciate that other components may be used to implement one or more of the blocks described herein.

In block 702, a message is received from a root device. The message is received by a receiving device. The message indicates that the receiving device will generate prospective synchronization messages. In an embodiment, the received message may include a device identifier of the receiving device. In an embodiment, the receiving device may be a non-root device. In an embodiment, the message received in block 702 may be a synchronization message.

In an embodiment, a root device of an ad-hoc network may transmit the message identifying a second device to generate prospective synchronization messages. This message may be received by one or more devices of the ad-hoc network. When the message is received by a device of the ad-hoc network, the receiving device may determine whether the second device identified by the received message is the receiving device. For example, the message may identify the second device by including a device identifier for the second device in the message. In an embodiment, the device identifier may be a wireless network station address. If the device identifier of the second device included in the message matches the device identifier of the receiving device, then the receiving device is identified by the message as the second device, which will generate prospective synchronization messages. If the receiving device is identified by the message, this may indicate that the receiving device is a back-up root node for the ad-hoc network.

Block 704 determines whether the root device is available. In an embodiment, the message indicating the non-root device will generate prospective synchronization messages may not be transmitted until a root device determines it will be leaving the ad-hoc network. In these embodiments, the root device may be determined to be unavailable when the message of block 702 is received. In an embodiment, reception of the message indicating a non-root device to generate prospective synchronization messages may indicate that the existing root node will soon be leaving the ad-hoc network. For example, the message may indicate the device will be leaving the ad-hoc network within 0.1, 0.5, 1, 2, or 5 seconds after the message is received. In some other embodiments, more than one message indicating a back-up root device that will generate prospective synchronization messages may be transmitted by a primary root device. In these embodiments, the root device may be determined to be unavailable if no synchronization messages are received from the root device within a predetermined time period.

In block 706, a synchronization message is transmitted based on the determining. For example, in an embodiment, a synchronization message may be transmitted if block 704 determines that the root device is not available.

Figure 8:
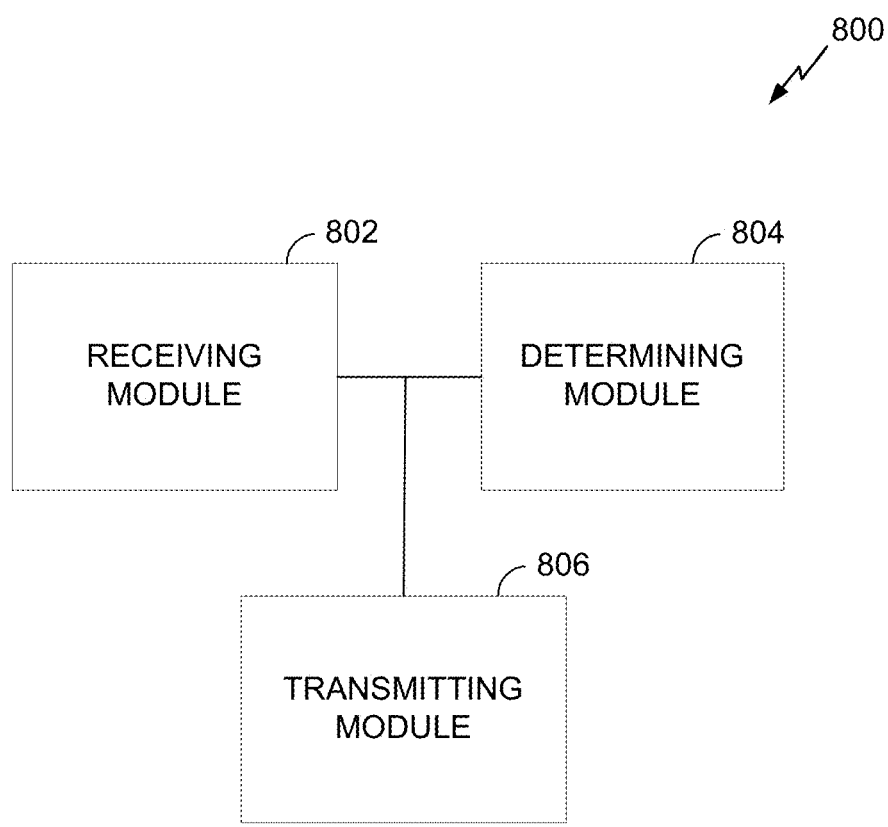
FIG. 8 is a functional block diagram of an exemplary wireless communication apparatus that may be employed with the wireless communication system of FIG. 1a, or FIG. 1b.

FIG. 8 is a functional block diagram of an exemplary wireless communication device 800 that may be employed with the wireless communication system of FIG. 1*a*, or FIG. 1*b*. The wireless device 800 may include a receiving module 802. In an embodiment, the receiving module 802 may be the receiver 212. In one aspect, means for receiving may include the receiving module 802. In one aspect, the receiving module 802 may also include one or more of a processor, signal generator, transceiver, decoder, or a combination of hardware and/or software component(s), circuits, and/or module(s). The receiving module 802 may be configured to perform one or more of the functions described above with respect to block 702 of FIG. 7. The wireless device 800 may further include a determining module 804. The determining module 804 may include the processor unit(s) 204 of FIG. 2. In one aspect, the determining module 804 may also include one or more of a processor, signal generator, transceiver, decoder, or a combination of hardware and/or software component(s), circuits, and/or module(s). In one aspect, means for determining may include the determining module 804. The determining module 804 may be configured to perform one or more of the functions described above with respect to block 704 of FIG. 7. The wireless device 800 may further include a transmitting module 806. The transmitting module 806 may include the transmitter 210 of FIG. 2. In one aspect, the transmitting module 806 may also include one or more of a processor, signal generator, transceiver, decoder, or a combination of hardware and/or software component(s), circuits, and/or module(s). In one aspect, means for transmitting may include the transmitting module 806. The transmitting module 806 may be configured to perform one or more of the functions described above with respect to block 706 of FIG. 7.

Figure 9:
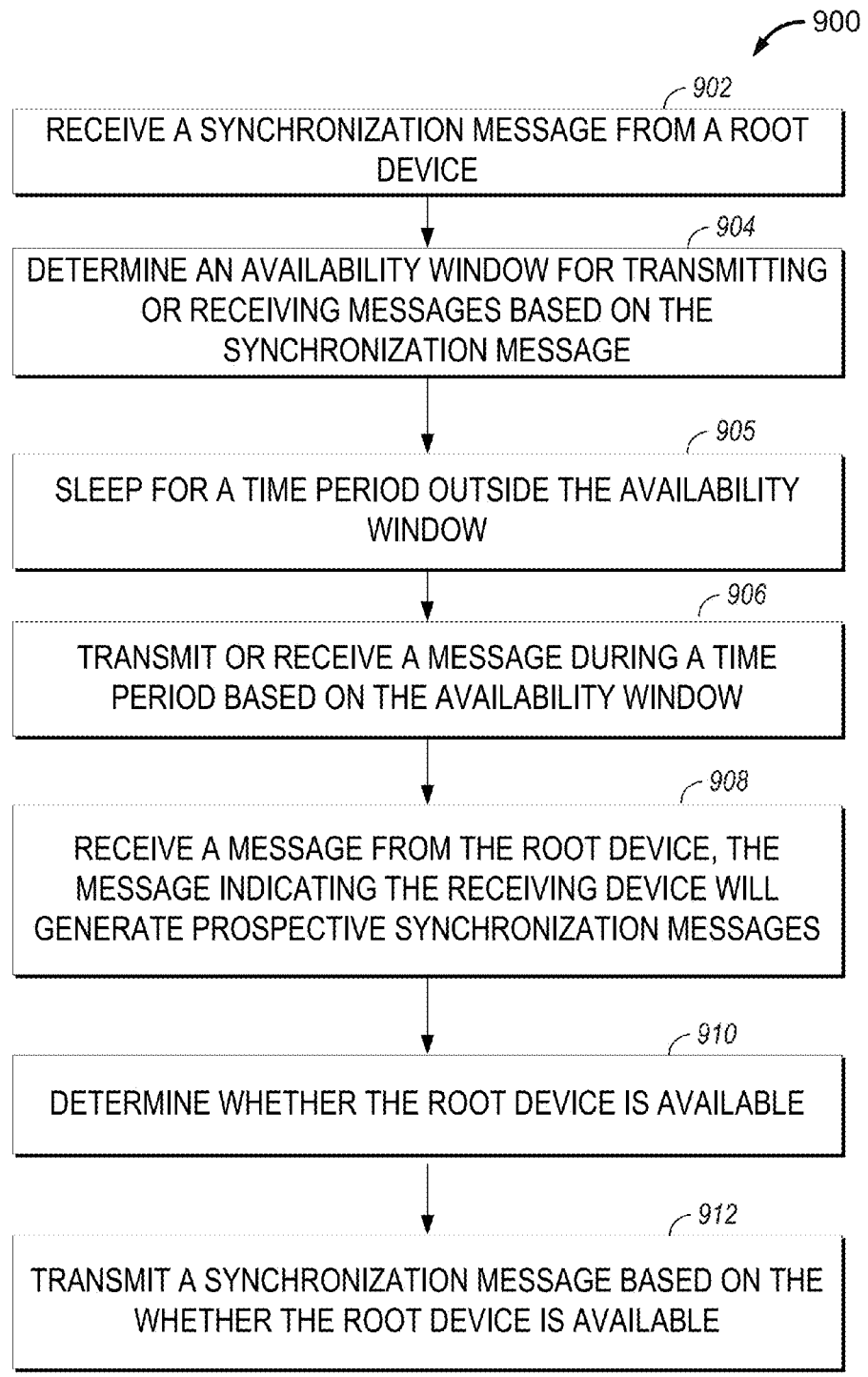
FIG. 9 is a flowchart of a method of synchronizing a wireless communications apparatus, in accordance with an embodiment.

FIG. 9 is a flowchart of a method 900 of wireless communication. In an embodiment, process 900 is performed by a non-root or back-up root device in an ad-hoc network. Although the method 900 is described below with respect to the elements of the wireless device 202, those having ordinary skill in the art will appreciate that other components may be used to implement one or more of the blocks described herein. Additionally, although the blocks of process 900 are shown and described in a particular order, the order that the blocks of process 900 are performed may vary by implementation. For example, while FIG. 9 shows block 905 above and/or before block 906, block 906 could be performed before block 905 in some implementations. Similarly, block 908 and/or block 910 could be performed before blocks 905 and/or block 906 in some implementations.

In block 902, a synchronization message is received from a root device. In some aspects, the synchronization message may indicate or include a clock reference. In block 904, an availability window for transmitting or receiving messages is determined based on the synchronization message. For example, in some implementations, the synchronization message includes a clock reference that is used to synchronize clocks among several nodes in an ad-hoc network. As discussed above, because the clocks of the nodes of the ad-hoc network are synchronized, a shared availability window may be determined by the nodes. The nodes may exchange messages during the availability window.

In block 905, a sleep state is entered for a time period that is outside the determined availability window. In some implementations, a device performing process 900 may not be able to transmit or receive messages while in the sleep state. In some implementations, power utilization may be reduced when compared to a non-sleep state, for example, a state where messages may be transmitted and/or received. In some aspects, the device performing process 900 may not enter a sleep state in block 905, but may instead refrain from transmitting and/or receiving any messages from a wireless network during the time period outside the availability window.

In block 906, a message is transmitted or received during a time period based on the availability window. In some implementations, the time period is the availability window. In some other implementations, the time period may be within the availability window but have a shorter duration than the availability window.

In block 908, a message is received from the root device. The message indicates that a device receiving the message will generate prospective synchronization messages. In an embodiment, the received message may include a device identifier of the receiving device. In an embodiment, the receiving device may be a non-root device. In an embodiment, the message received in block 908 may be a synchronization message. For example, in some aspects, the message received in block 902 and the message received in block 908 may be the same message.

In an embodiment, a root device of an ad-hoc network may transmit the message identifying a second device to generate prospective synchronization messages. This message may be received by one or more devices of the ad-hoc network. When the message is received by a device of the ad-hoc network, the receiving device may determine whether the device identified by the received message identifies the receiving device itself. For example, the message may identify the second device by including a device identifier in the message. In an embodiment, the device identifier may be a wireless network station address. If the device identifier included in the message matches the device identifier of the receiving device, then the receiving device is identified by the message. If the receiving device is identified by the message, this may indicate that the receiving device is a back-up root node for the ad-hoc network.

Block 910 determines whether the root device is available. In an embodiment, the message indicating the non-root device will generate prospective synchronization messages may not be transmitted until a root device determines it will be leaving the ad-hoc network. In these embodiments, the root device may be determined to be unavailable when the message of block 902 is received. In an embodiment, reception of the message indicating a non-root device to generate prospective synchronization messages may indicate that the existing root node will soon be leaving the ad-hoc network. For example, the message may indicate the device will be leaving the ad-hoc network within 0.1, 0.5, 1, 2, or 5 seconds after the message is received. In some other embodiments, more than one message indicating a back-up root device that will generate prospective synchronization messages may be transmitted by a primary root device. In these embodiments, the root device may be determined to be unavailable if no synchronization messages are received from the root device within a predetermined time period. In block 912, a synchronization message is transmitted based on whether the root device is available.

Figure 10:
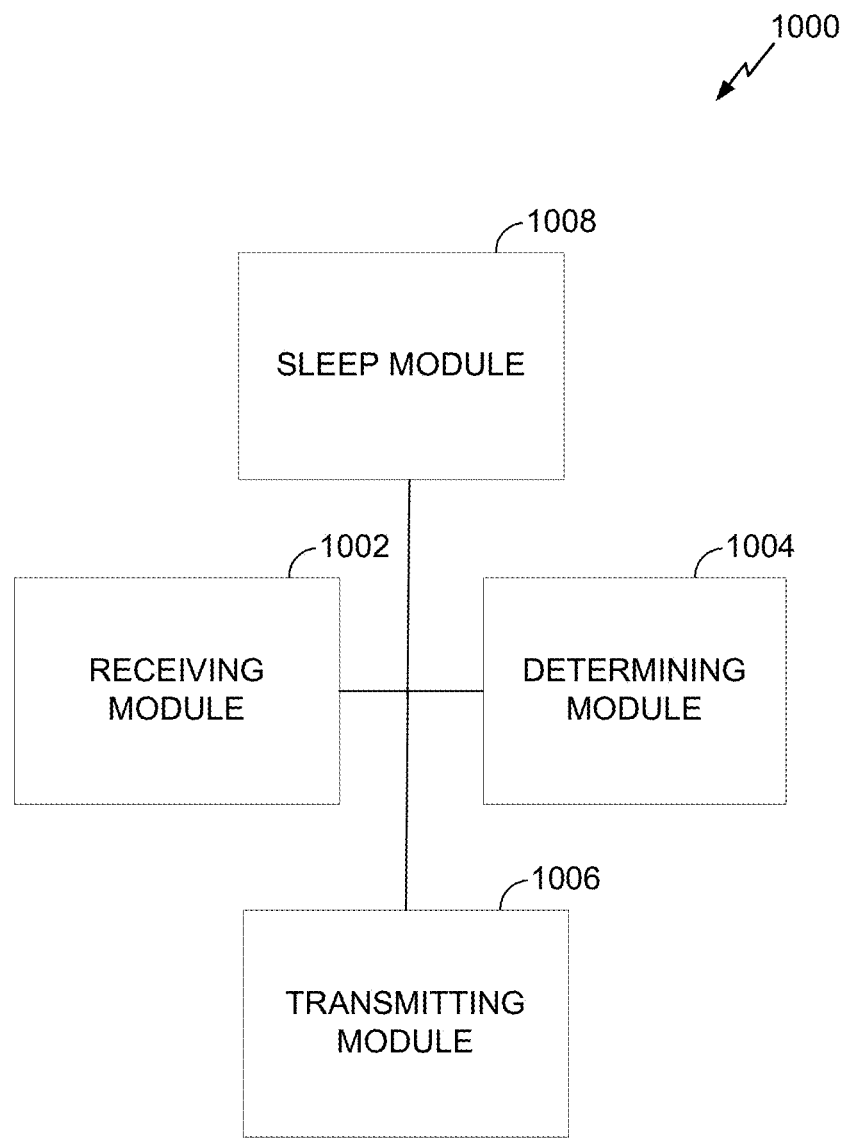
FIG. 10 is a functional block diagram of an exemplary wireless communication apparatus that may be employed with the wireless communication system of FIG. 1a, or FIG. 1b.

FIG. 10 is a functional block diagram of an exemplary wireless communication device 1000 that may be employed within the wireless communication system of FIG. 1*a* or FIG. 1*b*. The wireless device 1000 may include a receiving module 1002. In an embodiment, the receiving module 1002 may be the receiver 212. In one aspect, the receiving module 1002 may also include one or more of a processor, signal generator, transceiver, decoder, or a combination of hardware and/or software component(s), circuits, and/or module(s). In one aspect, means for receiving may include the receiving module 1002. The receiving module 1002 may be configured to perform one or more of the functions described above with respect to blocks 902, 906, and/or 908 of FIG. 9. The wireless device 1000 may further include a determining module 1004. The determining module 1004 may include the processor unit(s) 204 of FIG. 2. In one aspect, the determining module 1004 may also include one or more of a processor, signal generator, transceiver, decoder, or a combination of hardware and/or software component(s), circuits, and/or module(s). In one aspect, means for determining may include the determining module 1004. The determining module 1004 may be configured to perform one or more of the functions described above with respect to blocks 904 and/or 910 of FIG. 9.

The wireless device 1000 may further include a transmitting module 1006. The transmitting module 1006 may include the transmitter 210 of FIG. 2. In one aspect, the transmitting module 1006 may also include one or more of a processor, signal generator, transceiver, decoder, or a combination of hardware and/or software component(s), circuits, and/or module(s). In one aspect, means for transmitting may include the transmitting module 1006. The transmitting module 1006 may be configured to perform one or more of the functions described above with respect to blocks 906 and/or 912 of FIG. 9. The wireless device 1000 may further include a sleep module 1008. The sleep module 1008 may include the processor 204 of FIG. 2. In one aspect, the sleep module 1008 may also include one or more of a processor, signal generator, transceiver, decoder, or a combination of hardware and/or software component(s), circuits, and/or module(s). In one aspect, means for entering a sleep state may include the sleep module 1008. In one aspect, means for sleeping may include the sleep module 1008. The sleep module 1008 may be configured to perform one or more of the functions described above with respect to blocks 905 of FIG. 9.

Figure 11:
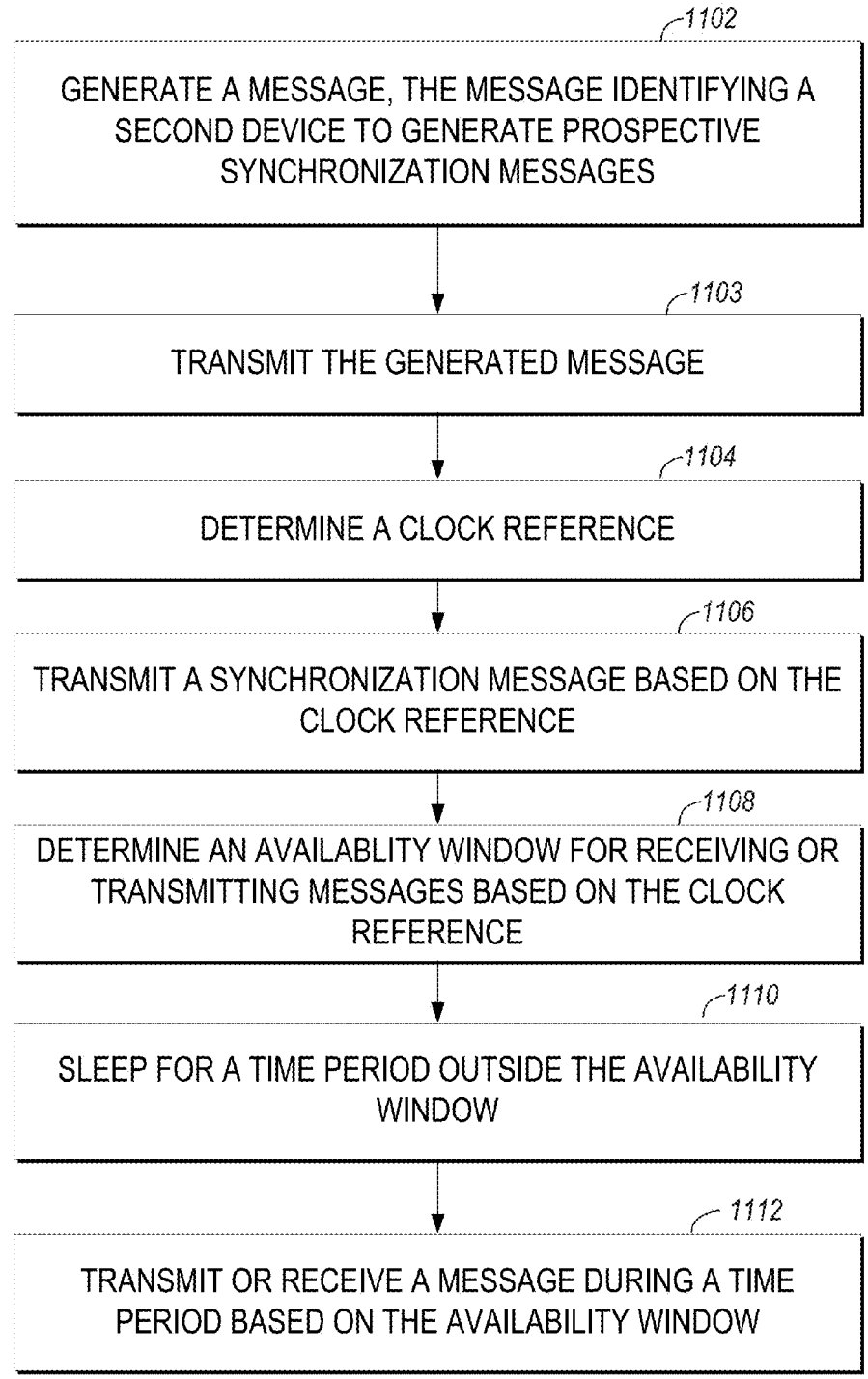
FIG. 11 is a flowchart of a method of synchronizing a wireless communications apparatus, in accordance with an embodiment.

FIG. 11 is a flowchart of a method 1100 of wireless communication. In an embodiment, process 1100 is performed by a root device in an ad-hoc network. In another embodiment, process 1100 is performed by a back-up root device in an ad-hoc network. Although the method 1100 is described below with respect to the elements of the wireless device 202, those having ordinary skill in the art will appreciate that other components may be used to implement one or more of the blocks described herein. Additionally, although the blocks of process 1100 are illustrated and discussed in a particular order, the order in which the blocks are implemented may vary by implementation.

At block 1102, a message is generated. The message identifies a second device to generate prospective synchronization messages. In an embodiment, a device identifier included in the message identifies the second device. In an embodiment, the message also includes timing information. In some implementations, the timing information is based on a hardware or device clock. In some implementations the message may include timing information to synchronize an availability window or discovery interval (DI) between nodes in an ad-hoc network, as discussed above with respect to FIG. 1b. In some aspects, the generated message is a synchronization message.

In block 1103, the generated message is transmitted. In some embodiments, the generated message is transmitted in response to a root node determining that it will be leaving an ad-hoc network. For example, a root device may transmit the generated message before leaving the network. In these embodiments, the device identified in the transmitted message may begin transmitting synchronization messages in response to receiving the message generated in block 1102. In these embodiments, the message generated in block 1102 identifies a second device that will generate immediately subsequent synchronization messages.

In another embodiment, the generated message may be transmitted periodically. In an embodiment, by periodically identifying another device to generate prospective synchronization messages, other nodes of an ad-hoc network can identify a back-up root device even if a root node leaves the ad-hoc network unexpectedly. For example, a hardware failure on a root node may prevent a root node from performing any specific processing before it leaves an ad-hoc network. Therefore, in some environments, a message identifying another device to generate prospective synchronization messages may be transmitted by the root node to other nodes in an ad-hoc network well before potential failures occur. In some embodiments, such a message may be transmitted periodically. This may result in a more efficient transition from a primary root node to the back-up root node.

In these embodiments, each node receiving the generated message may determine if the second device identified in the message is the receiving node. If the receiving node is identified, the receiving node may record an indication that it is a back-up root for the ad-hoc network.

In some embodiments, nodes may rely on an event other than reception of the generated message to determine that a new root should begin transmitting synchronization messages. For example, in an embodiment, the generated message may be transmitted by a primary root of an ad-hoc network. The generated message may identify a back-up root. In an embodiment, the back-up root may wait for synchronization messages to be received from the primary root. If no synchronization message is received from the primary root within a first predetermined time duration, the back-up root may begin transmitting synchronization messages for the ad-hoc network.

In these embodiments, if nodes on an ad-hoc network do not receive any synchronization messages within a second predetermined time duration, the devices may begin a resynchronization process to determine a new root. For example, in an embodiment, the nodes of the ad-hoc network may utilize a resynchronization process as described above with respect to FIG. 1c. In an embodiment, the second predetermined time duration is longer than the first predetermined time duration.

In block 1104, a clock reference is determined. For example, the clock reference may be based on a device or hardware clock. In block 1106, a synchronization message is transmitted. The synchronization message is based on the clock reference. For example, in some aspects, the synchronization message may indicate the clock reference, or my indicate a second clock reference that is based on the clock reference determined in block 1104. In some aspects, a synchronization message may be used by nodes on an ad-hoc network to determine a shared or common availability window as discussed above.

In block 1108, an availability window for receiving or transmitting messages is determined based on the clock reference. In block 1110, the device performing process 1100 sleeps for a time period outside the determined availability window. While the device is sleeping, it may be unable to receive or transmit messages. While the device is sleeping, it may operate at reduced power consumption compared to power consumption in a non-sleep or active state. In block 1112, a message is transmitted or received during a time period based on the availability window. In some aspects, the time period is equivalent to the availability window.

In an embodiment, process 1100 includes receiving a message identifying a device performing process 1100. In an embodiment, the message is received from a root node in the ad-hoc network. In an embodiment, reception of the message may indicate the device performing process 1100 is a back-up root for the ad-hoc network. In an embodiment, a back-up root may become a primary root when it transmits a synchronization message. In response to becoming a primary root, the primary root may begin determination of a second back-up root. In an embodiment, the back-up root may be determined based on a received signal strength indication (RSSI) or based on recent network activity. In an embodiment, a node with the highest RSSI may be selected as a back-up root. In an embodiment, the node with the smallest path loss to the root may be selected as a back-up root. In an embodiment, selection of the back-up root may be based on whether a node has been active within a predetermined time period. For example, in an embodiment, only nodes active within the past X seconds may be selected as a back-up root, where X may be any value depending on the implementation. In some embodiments, if a back-up root is not active within a predetermined time period, a new back-up root may be selected. In some embodiments, determination of a back-up root occurs periodically. In these embodiments, process 1100 may also be performed by a primary root periodically.

Figure 12:
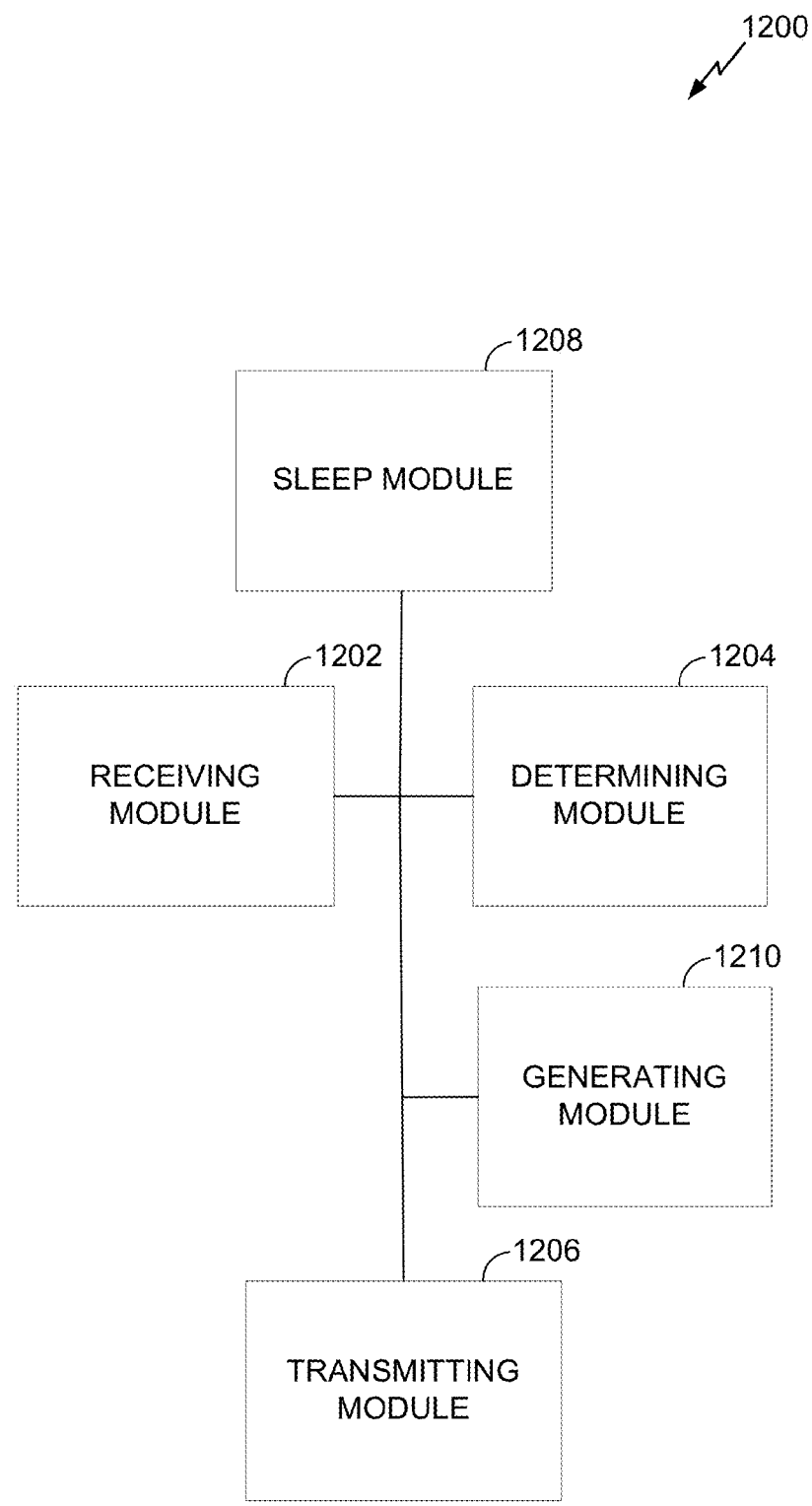
FIG. 12 is a functional block diagram of an exemplary wireless communication apparatus that may be employed with the wireless communication system of FIG. 1a, or FIG. 1b.

FIG. 12 is a functional block diagram of an exemplary wireless communication device 1200 that may be employed with the wireless communication system of FIG. 1a, or FIG. 1b. The wireless device 1200 may include a receiving module 1202. In an embodiment, the receiving module 1202 may be the receiver 212. In one aspect, the receiving module 1202 may also include one or more of a processor, signal generator, transceiver, decoder, or a combination of hardware and/or software component(s), circuits, and/or module(s). In one aspect, means for receiving may include the receiving module 1202. The receiving module 1202 may be configured to perform one or more of the functions described above with respect to blocks 1112 of FIG. 11. The wireless device 1200 may further include a determining module 1204. The determining module 1204 may include the processor unit(s) 204 of FIG. 2. In one aspect, the determining module 1204 may also include one or more of a processor, signal generator, transceiver, decoder, or a combination of hardware and/or software component(s), circuits, and/or module(s). In one aspect, means for determining may include the determining module 1204. The determining module 1204 may be configured to perform one or more of the functions described above with respect to blocks 1104 and/or 1108 of FIG. 11.

The wireless device 1200 may further include a transmitting module 1206. The transmitting module 1206 may include the transmitter 210 of FIG. 2. In one aspect, the transmitting module 1206 may also include one or more of a processor, signal generator, transceiver, decoder, or a combination of hardware and/or software component(s), circuits, and/or module(s). In one aspect, means for transmitting may include the transmitting module 1206. The transmitting module 1206 may be configured to perform one or more of the functions described above with respect to blocks 1103, 1106, and/or 1112 of FIG. 11. The wireless device 1200 may further include a sleep module 1208. The sleep module 1208 may include the processor 204 of FIG. 2. In one aspect, the sleep module 1208 may also include one or more of a processor, signal generator, transceiver, decoder, or a combination of hardware and/or software component(s), circuits, and/or module(s). In one aspect, means for entering a sleep state may include the sleep module 1208. In one aspect, means for sleeping may include the sleep module 1208. The sleep module 1208 may be configured to perform one or more of the functions described above with respect to blocks 1110 of FIG. 11. The wireless device 1200 may further include a generating module 1210. The generating module 1210 may include the processor 204 of FIG. 2. In one aspect, the generating module 1210 may also include one or more of a processor, signal generator, transceiver, decoder, or a combination of hardware and/or software component(s), circuits, and/or module(s). In one aspect, means for generating may include the generating module 1210. The generating module 1210 may be configured to perform one or more of the functions described above with respect to blocks 1102 of FIG. 11.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach.

Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by a root device within an ad-hoc network, comprising:
    negotiating, by a first device, with other devices of the ad-hoc network to determine the root device, wherein the negotiation includes each of the other devices designating itself as a preliminary root device and in response, transmitting synchronization messages, wherein a signal strength of the synchronization messages is usable by the other devices and the first device to determine the first device is the root device;
    determining, by the root device, one of the other devices with the highest signal strength that has been active within a predetermined time period is a back-up root device;
    generating, by the root device, an update to an availability window during which communication occurs between other devices of the ad-hoc network;
    generating, by the root device, a synchronization message, the synchronization message identifying the back-up root device to replace the root device and generate prospective synchronization messages in lieu of the root device, the prospective synchronization messages communicating a further updated availability window to the other devices of the ad-hoc network; and
    transmitting, by the root device, the synchronization message.

2. The method of claim 1, further comprising entering a sleep state based on the availability window.

3. The method of claim 1, wherein the synchronization message includes clock reference information.

4. The method of claim 1, wherein the synchronization message is retransmitted by one or more devices receiving the synchronization message.

5. The method of claim 1, further comprising determining, by the root device, that the root device is leaving the ad-hoc network, wherein the synchronization message is transmitted in response to the determining.

6. The method of claim 1, further comprising:
    determining, by the root device, the root device is a new root device based on a previous root device becoming unavailable;
    transmitting, by the root device, synchronization messages based on the determining; and
    negotiating, by the root device, with other nodes in the ad-hoc wireless network to determine the back-up root device.

7. The method of claim 1, further comprising receiving a synchronization message identifying the root device from a non-root device.

8. The method of claim 1, further comprising determining the back-up root device based on a received signal strength indication.

9. The method of claim 1, further comprising determining the back-up root device based on a path loss between the second device and the device.

10. The method of claim 1, further comprising determining the back-up root device periodically.

11. The method of claim 7, further comprising retransmitting the message received from the non-root device.

12. A device for wireless communication within an ad-hoc network, comprising:
    a processor configured to:
        negotiate with other devices of the ad-hoc network to determine the device is a root device, wherein the negotiation includes each of the other devices designating itself as a preliminary root device and in response, transmitting synchronization messages, wherein a signal strength of the synchronization messages is usable by the other devices and the device to determine the device is the root device;
        determine one of the other devices with the highest signal strength that has been active within a predetermined time period is a back-up root device;
        generate an update to an availability window during which communication occurs between other devices of the ad-hoc network;
        generate a synchronization message, the synchronization message identifying the back-up root device to replace the root device and generate prospective synchronization messages in lieu of the root device, the prospective synchronization messages communicating a further updated availability window to the other devices of the ad-hoc network; and
    a transmitter configured to transmit the synchronization message.

13. The device of claim 12, wherein the processor is further configured to cause the root device to enter a sleep state based on the availability window.

14. The device of claim 12, wherein the transmitted message identifies the back-up root device as a back-up root device for the ad-hoc network.

15. The device of claim 12, further comprising a receiver configured to receive a synchronization message identifying the root device.

16. The device of claim 12, wherein the processor is further configured to determine the back-up root device based on a received signal strength indication.

17. The device of claim 12, wherein the processor is further configured to determine the back-up root device based on a path loss between the second device and the device.

18. The device of claim 12, wherein the processor is further configured to determine the back-up root device periodically.

19. The device of claim 13, wherein the synchronization message includes clock reference information.

20. The device of claim 13, wherein the synchronization message is retransmitted by one or more devices receiving the synchronization message.

21. The device of claim 13, wherein the processor is further configured to determine that the root device is leaving the ad-hoc network, wherein the generated message is transmitted in response to the determining.

22. The device of claim 15, wherein the transmitter is further configured to retransmit the received message.

23. A device for wireless communication within an ad-hoc network, comprising:
  means for negotiating with other devices of the ad-hoc network to determine a root device for the ad-hoc network, wherein the negotiation includes each of the other devices designating itself as a preliminary root device and in response, transmitting synchronization messages, wherein a signal strength of the synchronization messages is usable by the device and the other devices to determine the device is the root device;
  means for determining one of the other devices with the highest signal strength that has been active within a predetermined time period is a back-up root device;
  means for generating an update to an availability window during which communication occurs between other devices of the ad-hoc network;
  means for generating a synchronization message, the synchronization message identifying the back-up root device to replace the root device and generate prospective synchronization messages in lieu of the root device, the prospective synchronization messages communicating a further updated availability window to the other devices of the ad-hoc network; and
  means for transmitting the synchronization message.

24. The device of claim 23, further comprising means for entering a sleep state based on the availability window.

25. The device of claim 23, further comprising means for determining that the device is leaving the ad-hoc network, wherein the means for transmitting is configured to transmit the generated message in response to the determining.

26. The device of claim 24, wherein the synchronization message includes clock reference information.

27. The device of claim 24, wherein the synchronization message is retransmitted by one or more devices receiving the synchronization message.

28. The device of claim 23, further comprising means for receiving a synchronization message identifying the root device.

29. The device of claim 23, further comprising means for determining the back-up root device based on a received signal strength indication.

30. The device of claim 23, further comprising means for determining the back-up root device based on a path loss between the second device and the device.

31. The device of claim 23, further comprising means for determining the back-up root device periodically.

32. The device of claim 28, further comprising means for retransmitting the received message.

33. A non-transitory, computer readable medium comprising instructions that when executed cause a processor in a root device to perform a method for wireless communication within an ad-hoc network, the method comprising:
  negotiating, by a first device, with other devices of the ad-hoc network to determine the root device, wherein the negotiation includes each of the other devices designating itself as a preliminary root device and in response, transmitting synchronization messages, wherein a signal strength of the synchronization messages is usable by the other devices and the first device to determine the first device is the root device;
  determining, by the root device, one of the other devices with the highest signal strength that has been active within a predetermined time period is a back-up root device;
  generating, by the root device, an update to an availability window during which communication occurs between other devices of the ad-hoc network;
  generating, by the root device, a synchronization message, the synchronization message identifying the back-up root device to replace the root device and generate prospective synchronization messages in lieu of the root device, the prospective synchronization messages communicating a further updated availability window to the other devices of the ad-hoc network; and
  transmitting, by the root device, the synchronization message.

34. The non-transitory, computer readable medium of claim 33, the method further comprising entering a sleep state based on the availability window.

35. The non-transitory, computer readable medium of claim 33, wherein the method further comprises determining that the root device is leaving the ad-hoc network, wherein the generated message is transmitted in response to the determining.

36. The non-transitory, computer readable medium of claim 33, the method further comprising receiving a message identifying the root device.

37. The non-transitory, computer readable medium of claim 33, the method further comprising determining the back-up root device based on a received signal strength indication.

38. The non-transitory, computer readable medium of claim 33, the method further comprising determining the back-up root device based on a path loss between the second device and the root device.

39. The non-transitory, computer readable medium of claim 34, wherein the synchronization message includes clock reference information.

40. The non-transitory, computer readable medium of claim 34, wherein the synchronization message is retransmitted by one or more devices receiving the synchronization message.

41. The non-transitory, computer readable medium of claim 36, the method further comprising retransmitting the received message.

42. The non-transitory, computer readable medium of claim 33, the method further comprising determining the back-up root device periodically.

43. A method of communicating over an ad-hoc wireless network using a non-root device, comprising:
- negotiating, by the non-root device, with other devices of the ad-hoc network to determine a root device, wherein the negotiation includes the non-root device and the other devices designating themselves each as a preliminary root device and in response, transmitting synchronization messages, wherein received signal strengths of the synchronization messages are usable by the non-root device to determine a root device;
- receiving, by the non-root device, a synchronization message from the root device, the message indicating an updated availability window during which communication by the non-root device occurs with other devices on the ad-hoc network, and that the non-root device will replace the root device and generate prospective synchronization messages in lieu of the root device, the synchronization messages communicating a further updated availability window during which communication occurs between other devices of the ad-hoc network;
- determining whether the root device is available; and
- transmitting, by the non-root device, a synchronization message in response to the root device being unavailable.

44. The method of claim 43, wherein determining whether the root device is available comprises determining whether a synchronization message has been received from the root device within a predetermined time period.

45. The method of claim 43, wherein determining whether the root device is available comprises determining that the root device will not be available based on receiving the message.

46. A non-root device for communicating over an ad-hoc wireless network, comprising:
- a processor configured to negotiate with other devices of the ad-hoc network to determine a root device, wherein the negotiation includes the non-root device and the other devices designating themselves each as a preliminary root device and in response, transmitting synchronization messages, wherein received signal strengths of the synchronization messages are usable by the non-root device to determine a root device;
- a receiver configured to receive a synchronization message from a root device, the synchronization message indicating an updated availability window during which communication by the non-root device occurs with other devices on the ad-hoc network, and that the non-root device will replace the root device and generate prospective synchronization messages in lieu of the root device, the synchronization messages communicating a further updated availability window during which communication occurs between other devices of the ad-hoc network, wherein the
- processor is further configured to determine whether the root device is available; and
- a transmitter configured to transmit a synchronization message in response to the root device being unavailable.

47. The non-root device of claim 46, wherein the processor is configured to determine whether the root device is available by at least in part determining whether a synchronization message has been received within a predetermined time period from the root device.

48. The non-root device of claim 46, wherein the processor is configured to determine whether the root device is available at least in part by determining that the root device will not be available based on receiving the message.

49. A non-root device for communicating over an ad-hoc wireless network, comprising:
- means for negotiating with other devices of the ad-hoc network to determine a root device, wherein the negotiation includes the non-root device and the other devices designating themselves each as a preliminary root device and in response, transmitting synchronization messages, wherein received signal strengths of the synchronization messages are usable by the non-root device to determine a root device;
- means for receiving a synchronization message from a root device, the synchronization message indicating an updated availability window during which communication by the non-root device occurs with other devices on the ad-hoc network, and that the non-root device will replace the root device and generate prospective synchronization messages in lieu of the root device, the synchronization messages communicating a further updated availability window during which communication occurs between other devices of the ad-hoc network;
- means for determining whether the root device is available; and
- means for transmitting a synchronization message in response to the root device being unavailable.

50. The non-root device of claim 49, wherein the means for determining is configured to determine whether a synchronization message has been received within a predetermined time period from the root device.

51. The non-root device of claim 49, wherein the means for determining is configured to determine whether the root device is available at least in part by determining that the root device will not be available based on receiving the message.

52. A non-transitory, computer readable medium comprising instructions that when executed cause a processor to perform a method of communicating over an ad-hoc wireless network using a non-root device, the method comprising:
- negotiating with other devices of the ad-hoc network to determine a root device, wherein the negotiation includes the non-root device and the other devices designating themselves each as a preliminary root device and in response, transmitting synchronization messages, wherein received signal strengths of the synchronization messages are usable by the non-root device to determine a root device;
- receiving a synchronization message from a root device, the synchronization message indicating an updated availability window during which communication by the non-root device occurs with other devices on the ad-hoc network, and that the non-root device will replace the root device and generate prospective synchronization messages in lieu of the root device, the synchronization messages communicating a further updated availability window during which communication occurs between other devices of the ad-hoc network;
- determining whether the root device is available; and
- transmitting a synchronization message in response to the root device being unavailable.

53. The non-transitory, computer readable medium of claim 52, wherein determining whether the root device is available comprises determining whether a synchronization message has been received within a predetermined time period.

54. The non-transitory, computer readable medium of claim 52, wherein determining whether the root device is available comprises determining that the root device will not be available based on receiving the message.

* * * * *